(12) United States Patent
Stewart et al.

(10) Patent No.: US 8,205,523 B2
(45) Date of Patent: Jun. 26, 2012

(54) PEDAL ASSEMBLY FOR VEHICLES

(75) Inventors: Geoffrey D. Stewart, Evans, GA (US);
Craig D. Wieberdink, Martinez, GA (US)

(73) Assignee: Club Car, LLC, Evans, GA (US)

(*) Notice: Subject to any disclaimer, the term of this patent is extended or adjusted under 35 U.S.C. 154(b) by 1204 days.

(21) Appl. No.: 12/001,172

(22) Filed: Dec. 10, 2007

(65) Prior Publication Data
US 2009/0145260 A1  Jun. 11, 2009

(51) Int. Cl.
G05G 1/30      (2008.04)
G05G 5/06      (2006.01)
B60K 28/12     (2006.01)
B60K 28/14     (2006.01)
B60K 21/00     (2006.01)

(52) U.S. Cl. ............ 74/512; 74/513; 74/514; 74/539; 74/560; 188/282

(58) Field of Classification Search ............ 74/512–514, 74/539, 560; 180/282
See application file for complete search history.

(56) References Cited

U.S. PATENT DOCUMENTS

| | | | |
|---|---|---|---|
| 2,905,024 A | 9/1959 | McCarthy et al. | |
| 4,278,143 A * | 7/1981 | Nagai | 180/282 |
| 4,497,395 A | 2/1985 | Nogami et al. | |
| 4,872,368 A | 10/1989 | Porter | |
| 5,588,335 A | 12/1996 | Strait | |
| 6,415,681 B1 | 7/2002 | Porter et al. | |
| 6,457,568 B2 | 10/2002 | Lang et al. | |
| 6,591,711 B2 | 7/2003 | Porter et al. | |
| 7,051,614 B2 | 5/2006 | Podkopayev | |
| 2003/0036459 A1 | 2/2003 | Jeon | |
| 2006/0169549 A1 | 8/2006 | Lang et al. | |
| 2006/0230869 A1 * | 10/2006 | Cosby et al. | 74/512 |
| 2007/0234837 A1 * | 10/2007 | Russell | 74/473.12 |
| 2011/0023652 A1 * | 2/2011 | Cosby et al. | 74/513 |

FOREIGN PATENT DOCUMENTS

| | | |
|---|---|---|
| WO | 2004/068254 | 8/2004 |
| WO | 2007/053559 | 5/2007 |

OTHER PUBLICATIONS

EP08253386.0 European Search Report, 7 pages, Dated Mar. 20, 2009.

* cited by examiner

*Primary Examiner* — Vinh T. Luong
(74) *Attorney, Agent, or Firm* — Michael Best & Friedrich LLP

(57) ABSTRACT

A pedal assembly is for a vehicle including a motor and a braking mechanism. An actuator pedal is coupled with the vehicle so as to be displaceable between initial and maximum displaced positions and operatively connected with the motor. A brake pedal is coupled with the vehicle so as to be displaceable between initial and park positions and operatively coupled with the braking mechanism to actuate the mechanism in the park position. A brake retainer mechanism includes a coupler connected with the brake pedal and a retainer coupled with the vehicle so as to be angularly displaceable about an axis. The retainer is releasably engageable with the coupler and the actuator pedal to prevent angular displacement of the retainer in a first direction about the retainer axis. As such, the brake pedal is retained at the park position when the coupler and the actuator pedal are engaged with the retainer.

36 Claims, 16 Drawing Sheets

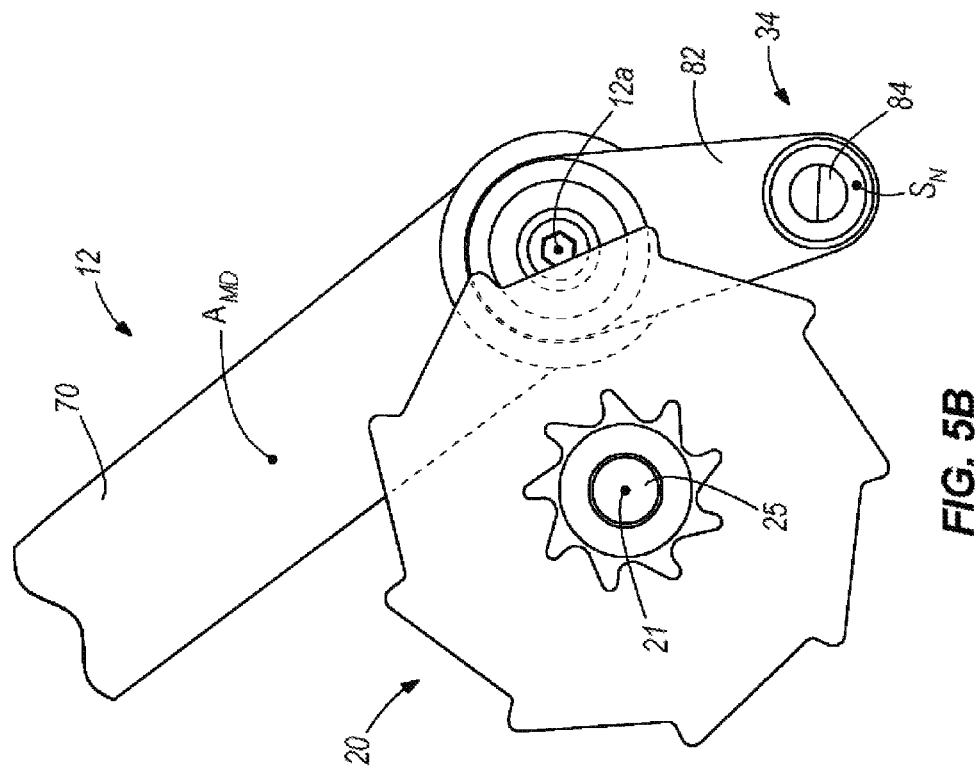
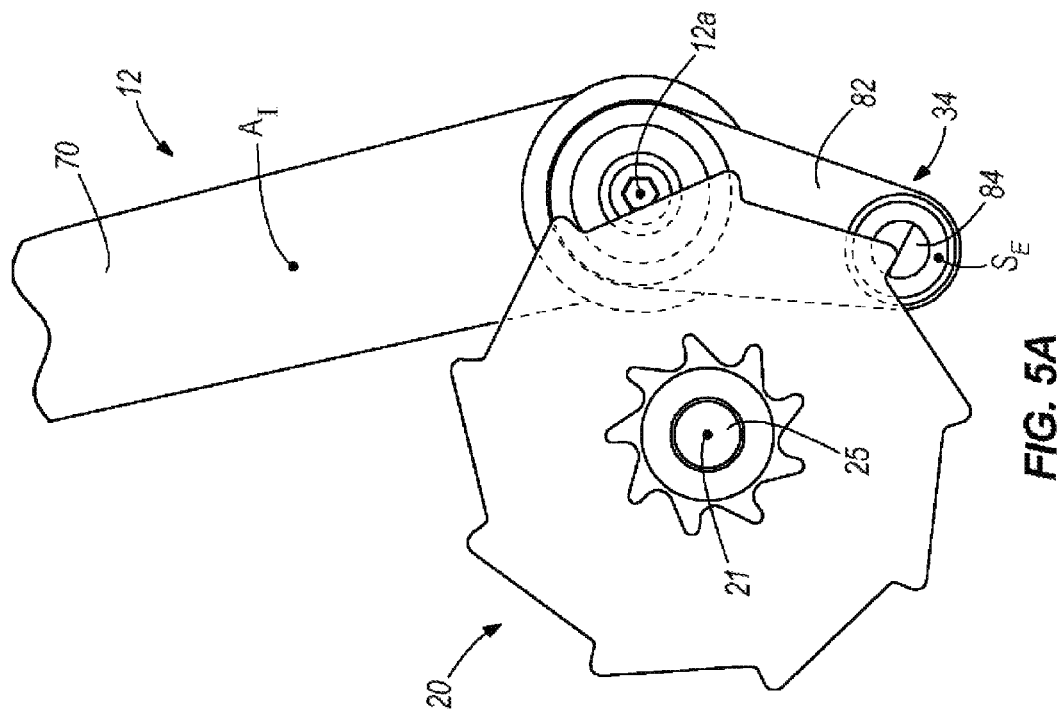
FIG. 5B
FIG. 5A

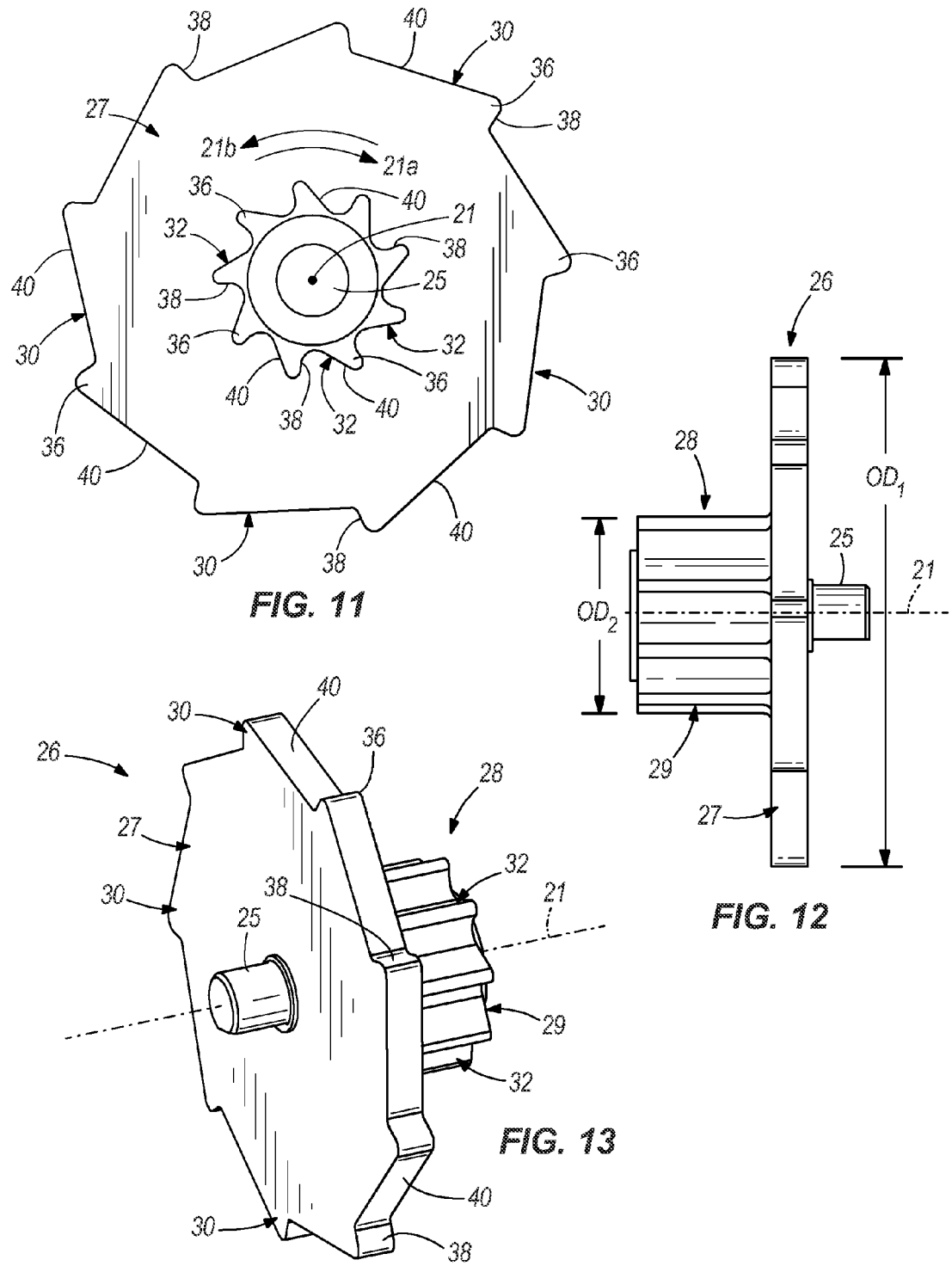

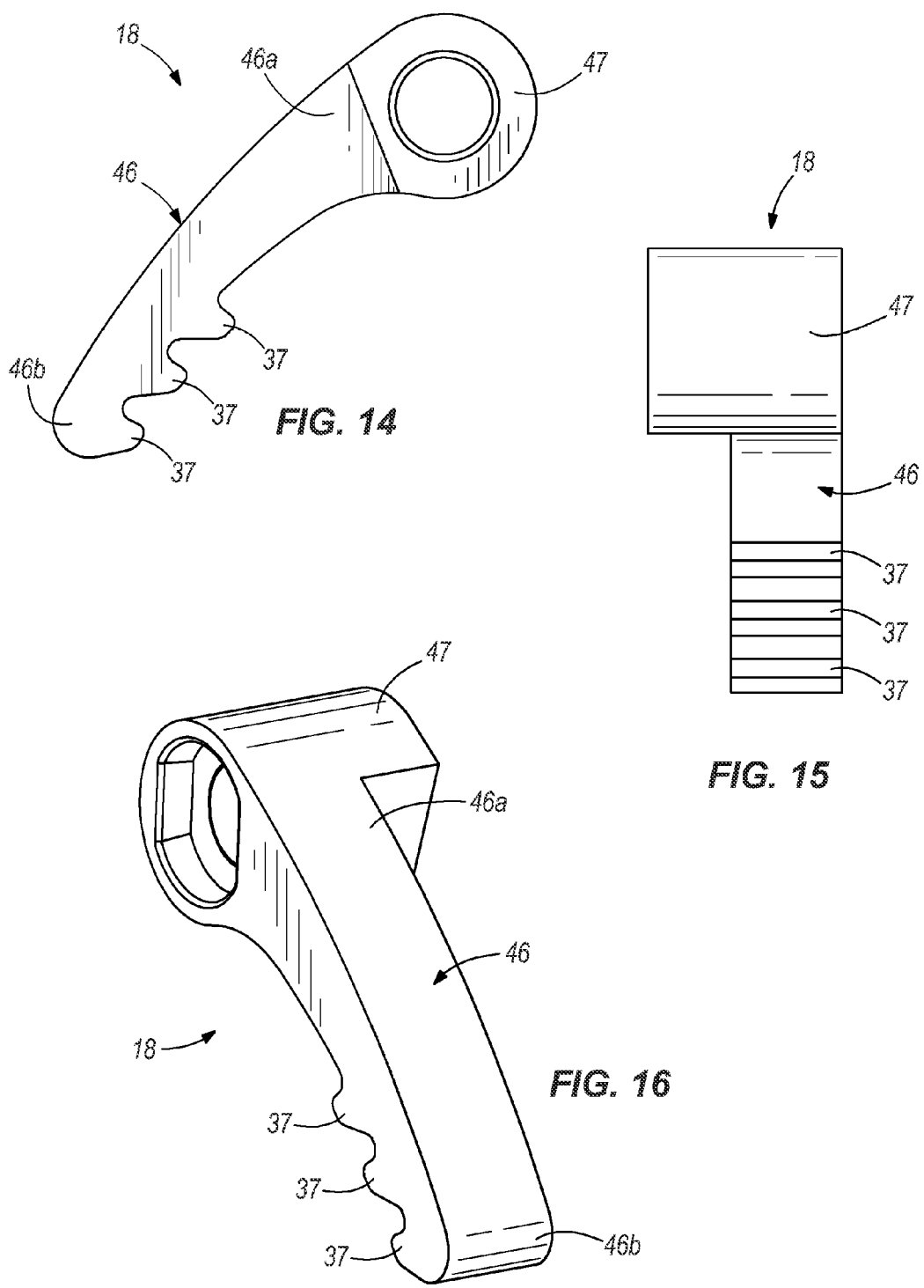

PEDAL ASSEMBLY FOR VEHICLES

The present invention relates to pedal assemblies for vehicles, and more particularly to park brake retainer devices for such pedal assemblies.

Pedal assemblies are known and basically include an actuator or "accelerator" pedal and a brake pedal. The actuator/accelerator pedal is coupled with a motor, typically either an electric motor or an internal combustion engine, so as to regulate vehicle speed. The brake pedal is coupled with a braking mechanism and is operable by a vehicle operator to slow and/or stop the vehicle during use. Often, the brake pedal includes a park brake configured to retain the brake pedal at a fixed or "park" position so that the braking mechanism prevents an unattended vehicle from "rolling away" during vehicle use.

SUMMARY OF THE INVENTION

In one aspect, the present invention is a pedal assembly for a vehicle, the vehicle including a motor and a braking mechanism. The pedal assembly comprises an actuator pedal movably coupled with the vehicle so as to be displaceable between an initial position and a maximum displaced position, the actuator pedal being operatively connected with the motor. A brake pedal is movably coupled with the vehicle so as to be displaceable between an initial position and a park position. The brake pedal is operatively coupled with the braking mechanism so as to actuate the braking mechanism in the brake park position. Further, a brake retainer mechanism includes a coupler connected with the brake pedal and a retainer movably coupled with the vehicle so as to be angularly displaceable about an axis. The retainer is configured to be releasably engageable with the coupler and configured to be releasably engageable with the actuator pedal so as to substantially prevent angular displacement of the retainer in a first direction about the retainer axis. As such, the brake pedal is releasably retained at the park position when each of the coupler and the actuator pedal is engaged with the retainer.

In another aspect, the present invention is again a pedal assembly for a vehicle, the vehicle including a motor and a braking mechanism. The pedal assembly comprises an actuator pedal movably coupled with the vehicle so as to be displaceable between an initial position and a maximum displaced position, the actuator pedal being operatively connected with the motor. A brake pedal is movably coupled with the vehicle so as to be displaceable between an initial position and a park position, the brake pedal being operatively coupled with the braking mechanism so as to actuate the braking mechanism in the brake park position. Further, a coupler connected with the brake pedal and a retainer is movably coupled with the vehicle so as to be angularly displaceable about an axis. The retainer includes first and second generally cylindrical portions, each cylindrical portion having a plurality of teeth. The actuator pedal is engageable with at least one of the teeth of the retainer first portion so as to prevent angular displacement of the retainer about the retainer axis. Furthermore, the coupler is engageable with at least one of the teeth of the retainer second portion such that the brake pedal is releasably retained at the park position when the actuator pedal is engaged with the retainer.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 4, are each a side elevational view of the pedal assembly showing a brake pedal in an initial position and in a park position, respectively;

FIGS. 5A and 5B, collectively FIG. 5, are each a more diagrammatic, broken away view of the pedal assembly showing an actuator pedal in an initial position and a maximum displacement position, respectively;

FIG. 11 is a side plan view of the retainer;

FIG. 12 is a front plan view of the retainer;

FIG. 13 is a perspective view of the retainer;

FIG. 14 is a side plan view of the coupler;

FIG. 15 is a bottom plan view of the coupler;

FIG. 16 is a perspective view of the coupler;

DETAILED DESCRIPTION OF THE INVENTION

Figure 1:
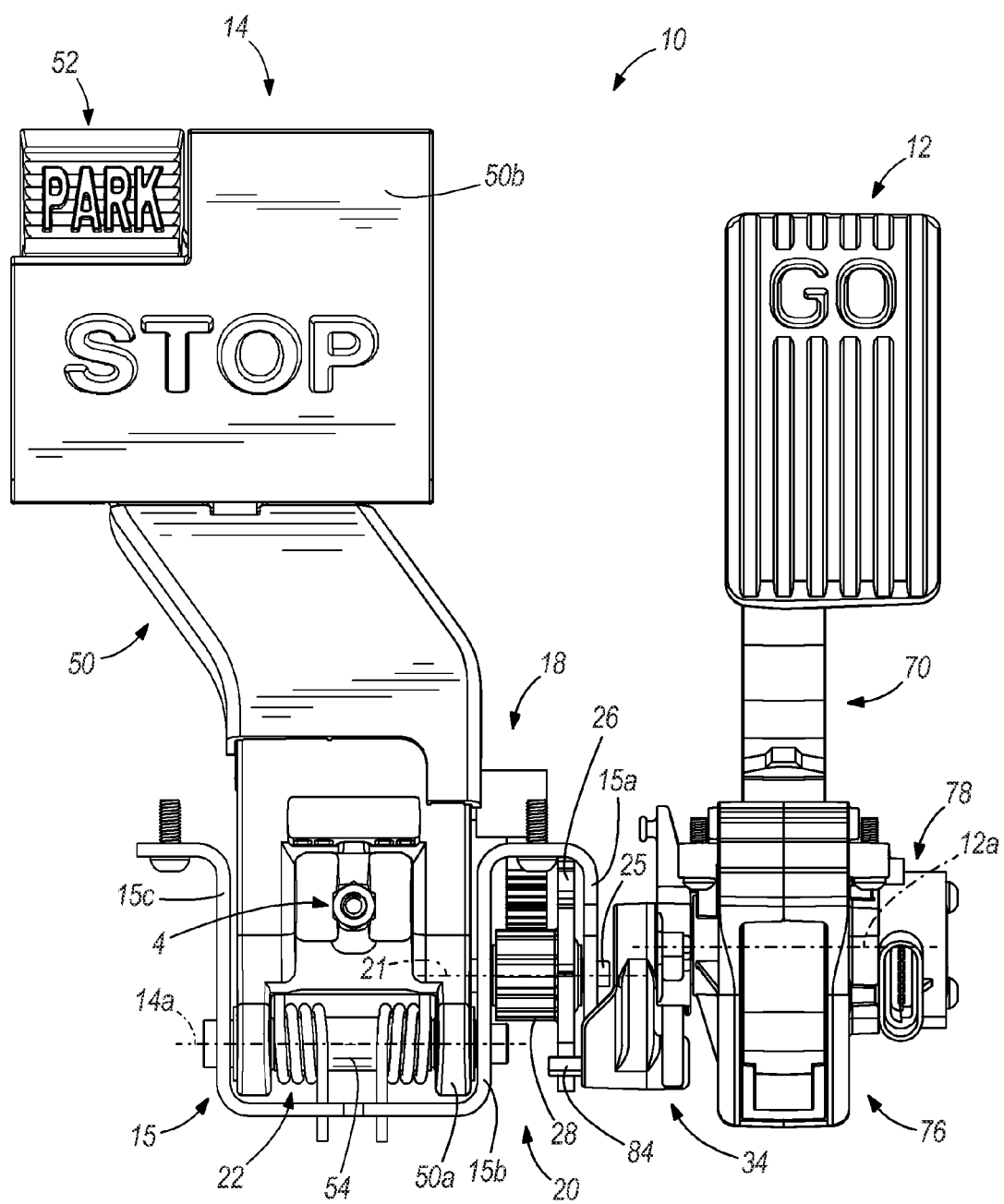
FIG. 1 is a front elevational view of a pedal assembly in accordance with the present invention.
Figure 2:
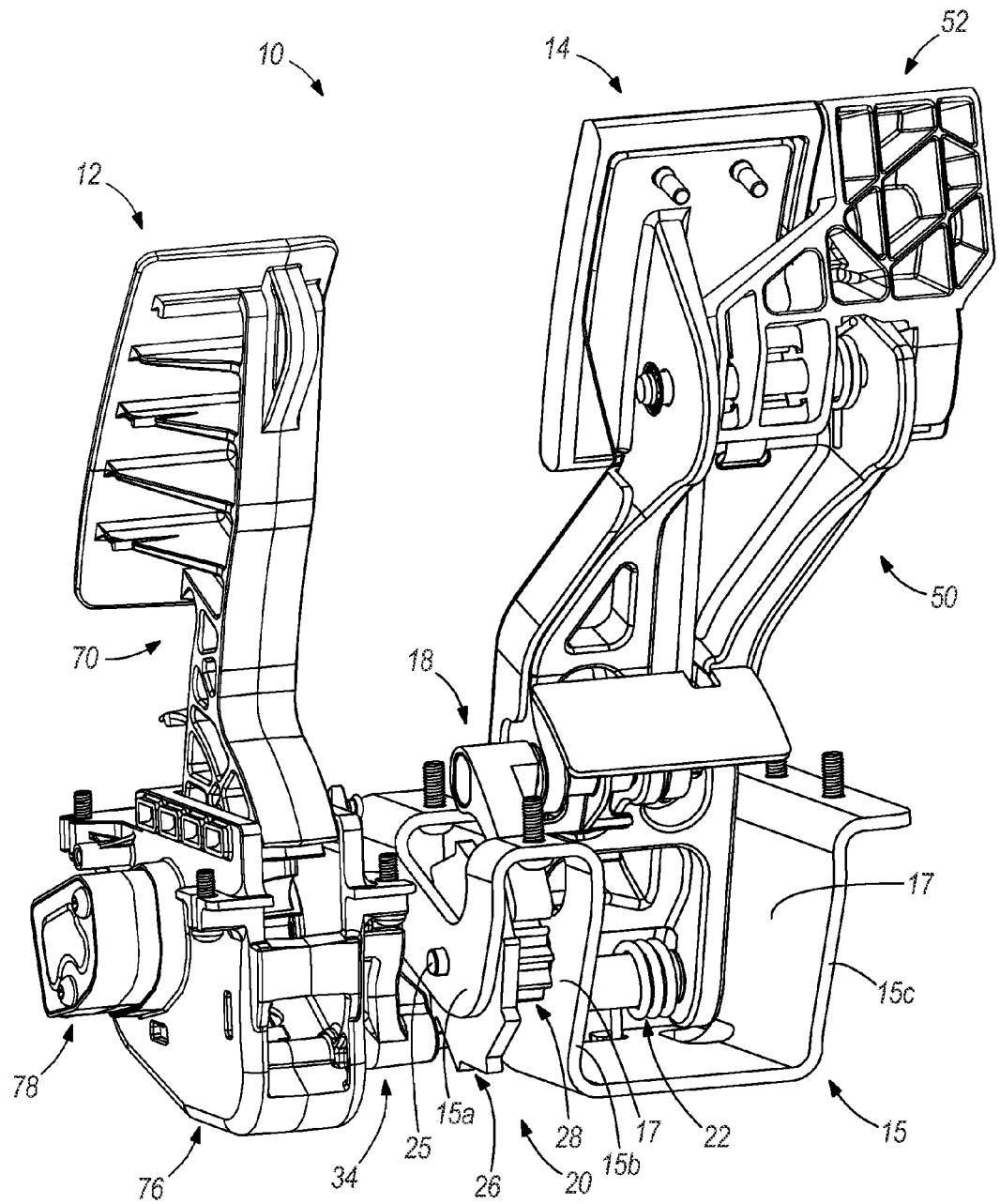
FIG. 2 is a rear perspective view of the pedal assembly.
Figure 3:
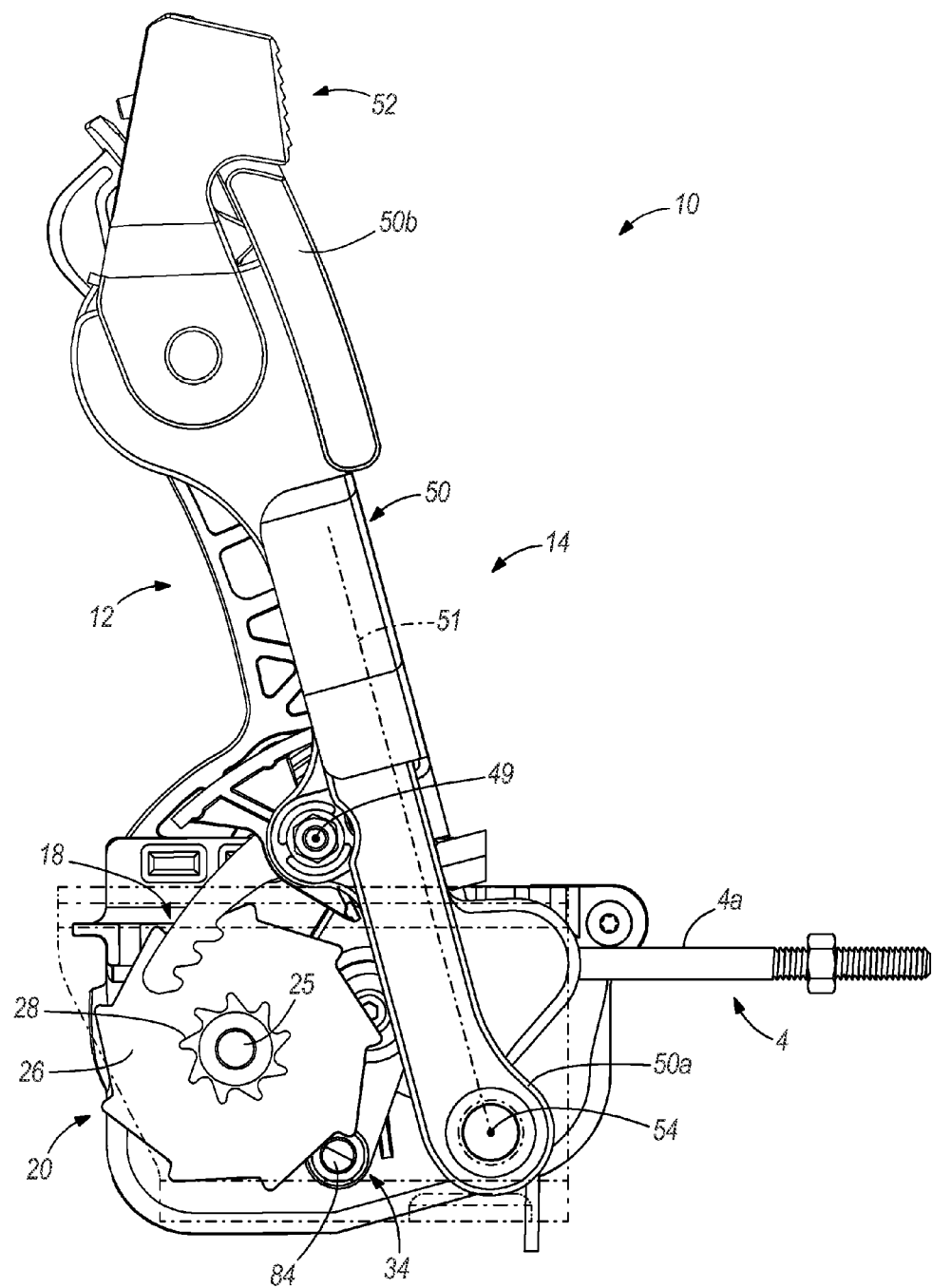
FIG. 3 is a side elevational view of the pedal assembly.
Figure 4A:
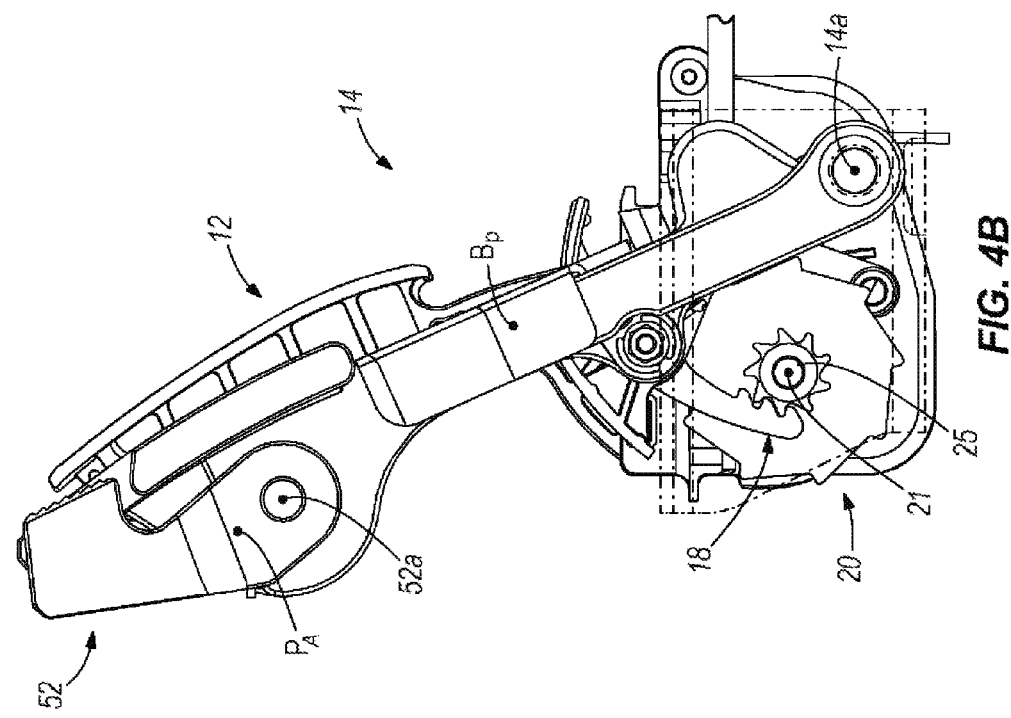
FIGS. 4A and 4B, collectively
Figure 4B:
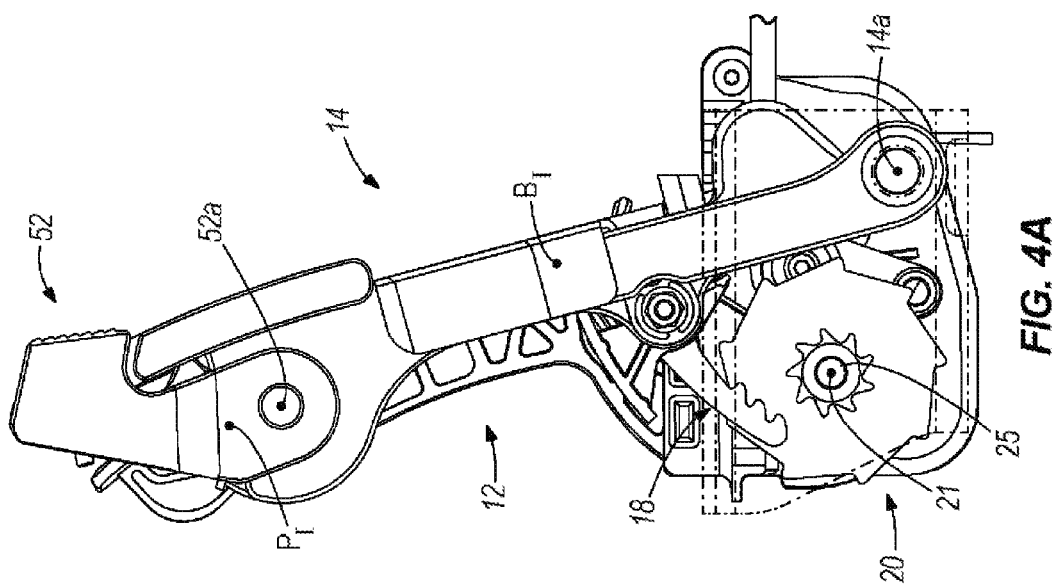
Figure 7:
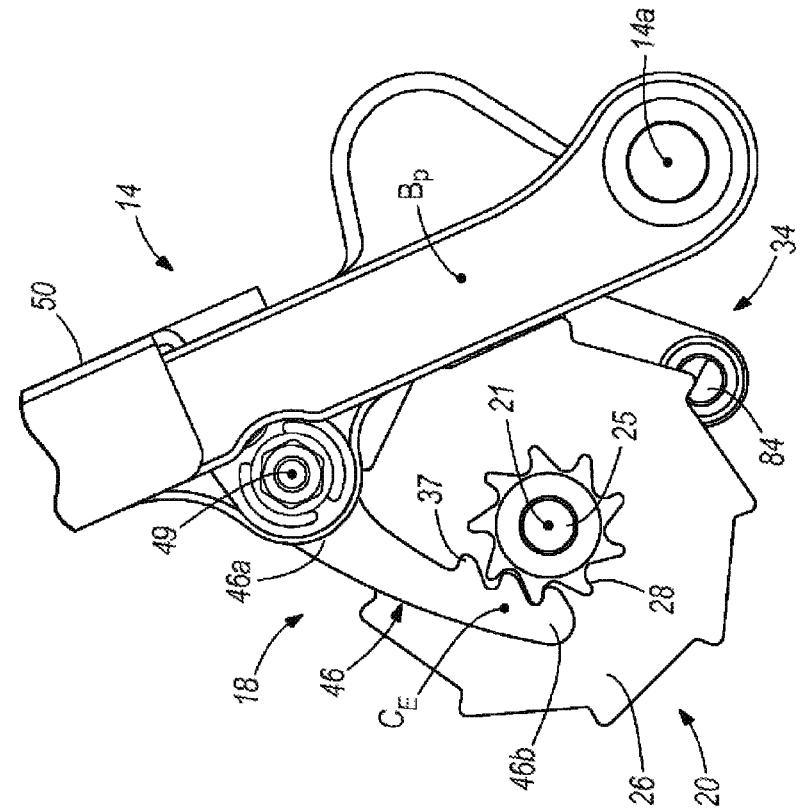
FIG. 7 is another view of the components of FIG. 6, showing the coupler engaged with the retainer and the pedal in the park position.
Figure 6:
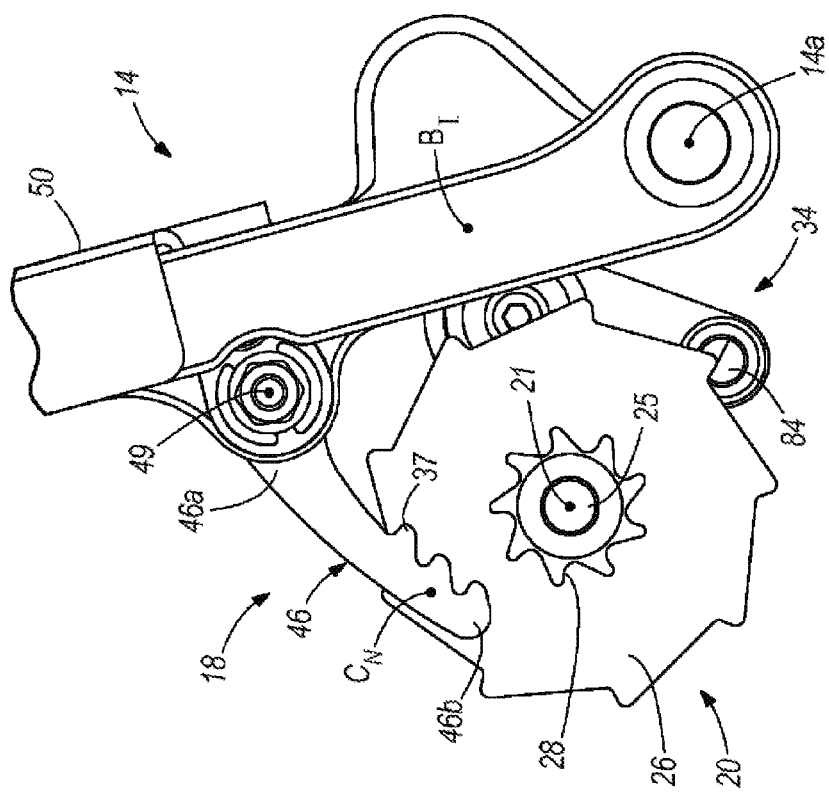
FIG. 6 is broken-away, side elevational view of the brake pedal, a retainer and a coupler, showing the brake pedal in the initial position.
Figure 8:
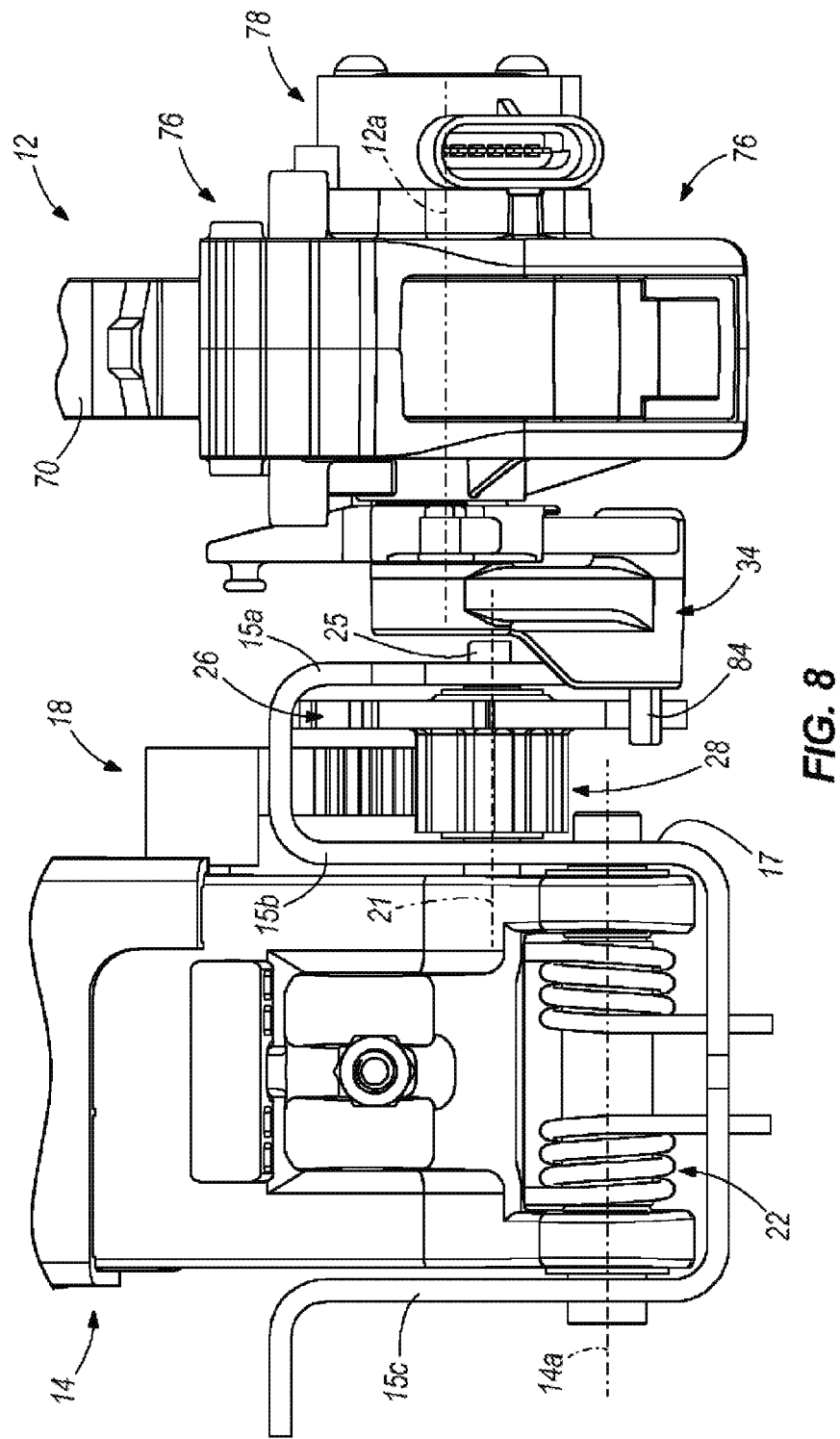
FIG. 8 is an enlarged, broken-away front elevational view of the pedal assembly.
Figure 9:
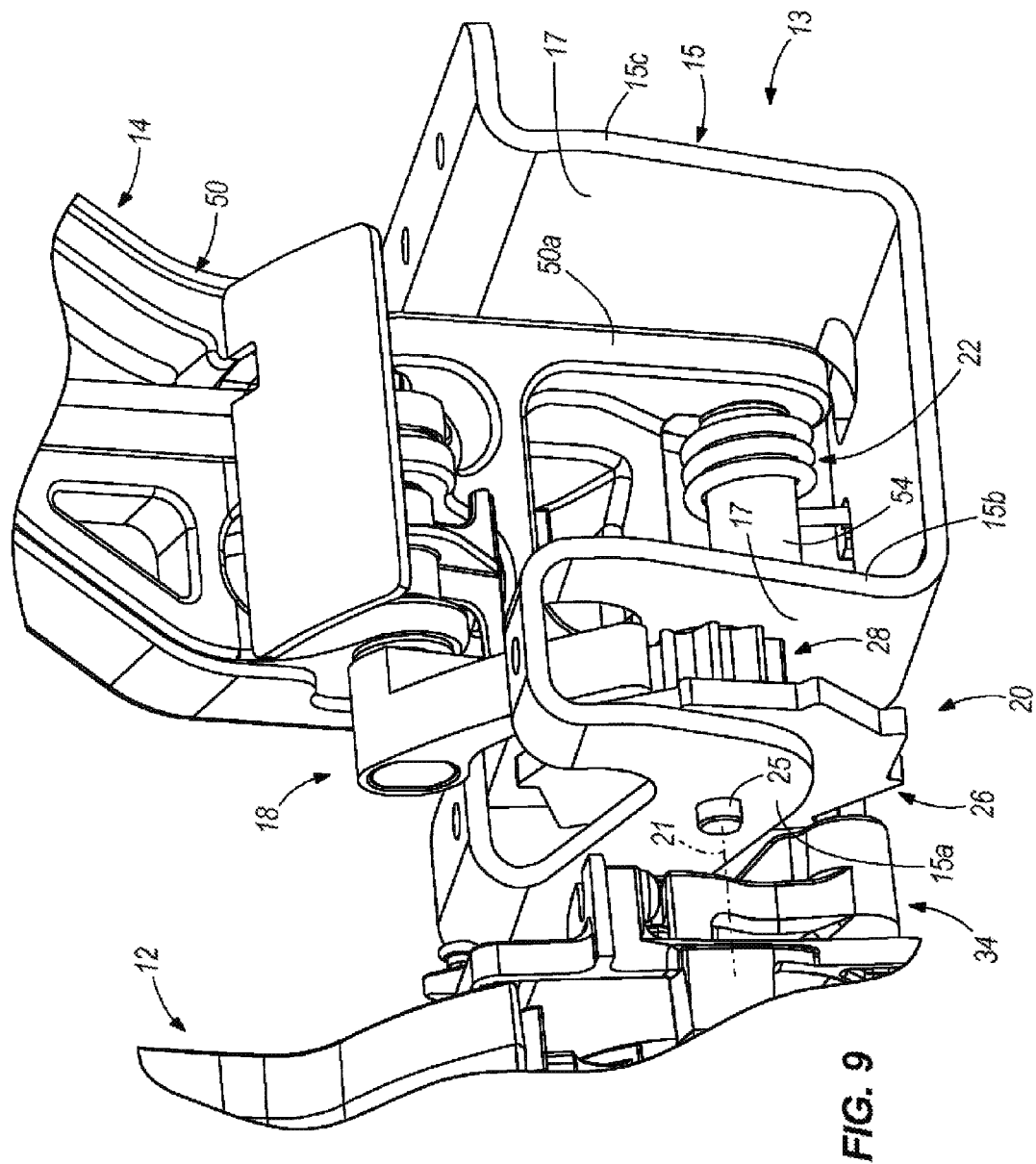
FIG. 9 is an enlarged, broken-away rear perspective view of the pedal assembly.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. Furthermore, the term "position" is used herein to indicate a position, location, configuration, orientation, etc., of one or more components of the lock assembly and each is depicted in the drawings with reference to a randomly selected point on the item being described. Such movement reference points in the drawing figures are randomly selected for convenience only and have no particular relevance to the present invention. The terminology includes the words specifically mentioned above, derivatives thereof, and words of similar import.

Figure 25:
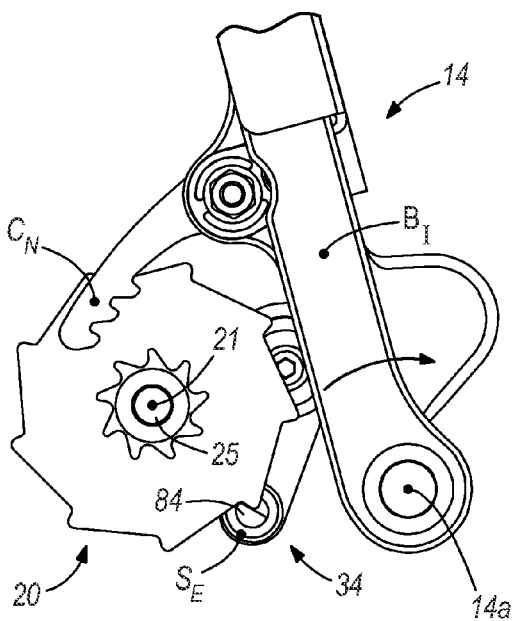
FIG. 25 is another view of the components of FIG. 18, moving toward the initial position, the coupler at the nonengaged position and the actuator stop at the engaged position.
Figure 26:
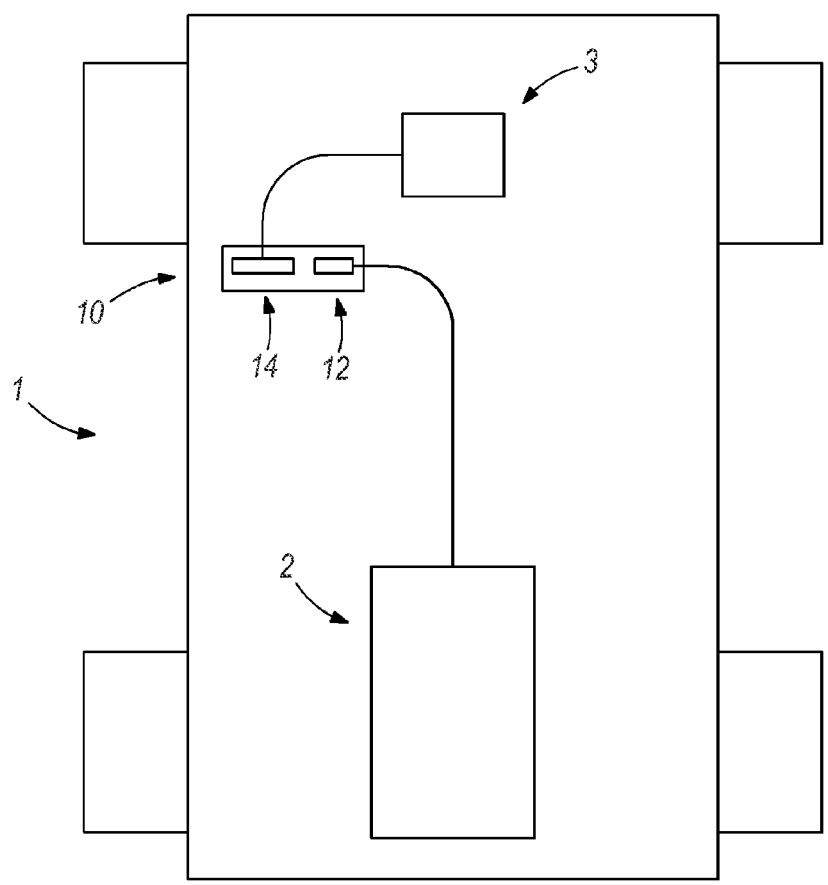
FIG. 26 is a more diagrammatic view of a vehicle incorporating the pedal assembly.
Figure 27:
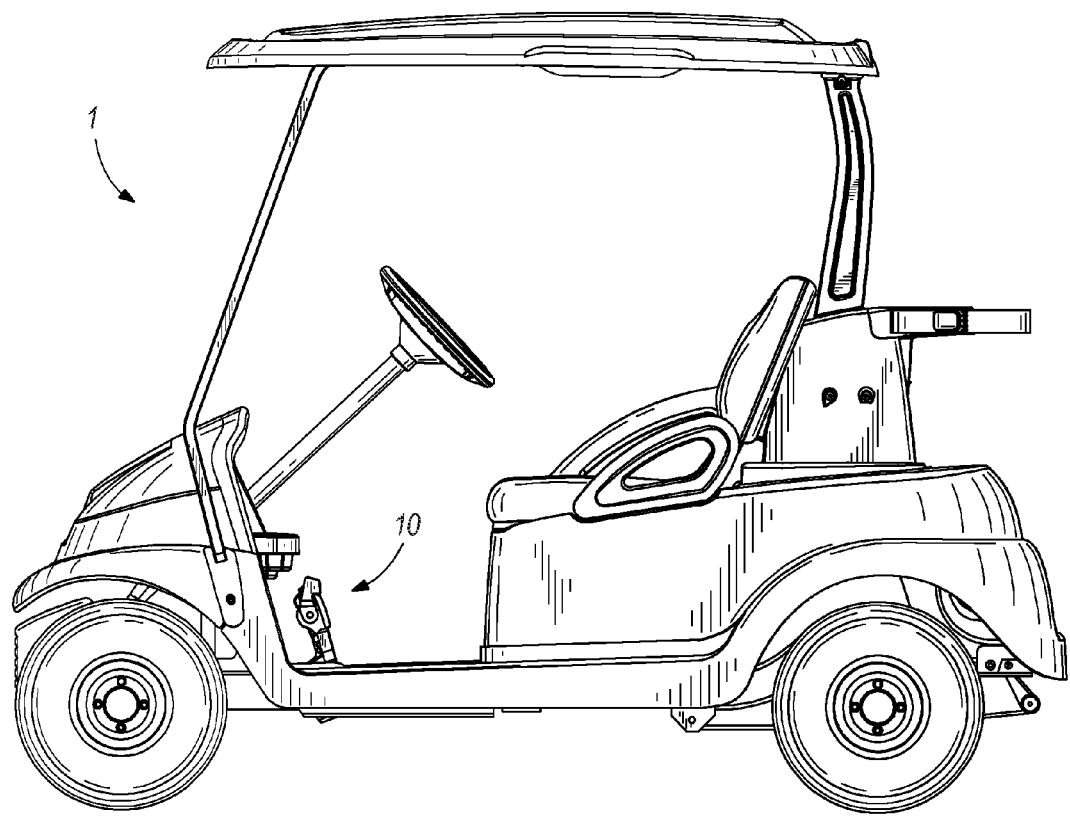
FIG. 27 is a perspective view of an exemplary vehicle incorporating the pedal assembly.

Referring now to the drawings in detail, wherein like numbers are used to indicate like elements throughout, there is shown in FIGS. 1-27 a pedal assembly 10 for a vehicle 1, the vehicle 1 including a motor 2 and a braking mechanism 3 (see FIGS. 26 and 27). The pedal assembly 10 basically comprises an actuator pedal 12, a brake pedal 14, and a brake retainer mechanism. The actuator pedal 12 is movably coupled with the vehicle 1 so as to be displaceable between an initial position AI (e.g., FIG. 5A) and a maximum displaced position AMD (FIG. 5B), and is operatively connected with the motor 2. Specifically, the actuator pedal 12 is configured such that displacement of the actuator pedal 12 from the initial position AI toward the maximum displacement position AMD increases motor speed, the motor 2 being any appropriate type of vehicle motor such as an internal combustion engine, an electric motor, a hydraulic motor, etc. The brake pedal 14 is movably coupled with the vehicle 1 so as to be displaceable between an initial position BI and a park position BP, and preferably also to a maximum displaced position BMD (FIG. 24), as described below. The brake pedal 14 is operatively coupled with the braking mechanism 3 so as to actuate the mechanism 3 in the brake park position BP, and preferably actuates the mechanism 3 in a plurality of positions between the initial and maximum displaced positions BI, BMD. Further, the brake retainer mechanism includes a coupler 18 connected with the brake pedal 14 and a retainer 20 movably coupled with the vehicle 1 so as to be angularly displaceable about an axis 21. Preferably, the pedal assembly 10 further comprises a base 11 mounted to the vehicle 1, with each component 12, 14 being connected with and/or disposed within the base 11, but each such component may be separately or/and directly mounted to the vehicle 1.

Furthermore, the retainer 20 is configured to releasably engage with the coupler 18 and configured to releasably engage with the actuator pedal 12 so as to substantially prevent angular displacement of the retainer 20 about the retainer axis 21. As such, the brake pedal 14 is releasably retained at the park position BP when the coupler 18 is engaged with the retainer 20 and the retainer 20 is "rotationally fixed" by the actuator pedal 12, as described in greater detail below. More specifically, the retainer 20 and/or the actuator pedal 12 are/is configured to engage with the other one of the retainer 20 and actuator pedal 12 when the actuator pedal 12 is located at least generally proximal to the actuator pedal initial position AI. When the retainer 20 and actuator pedal 12 are so engaged, the actuator pedal 12 prevents angular displacement 12 of the retainer in a first direction 21$a$ about the retainer axis 21. Also, at least one of the retainer 20 and the actuator pedal 12 is configured to disengage from the other one of the retainer 20 and the actuator pedal 12 when the actuator pedal 12 displaces from the initial position AI toward the maximum displacement position AMD. As such, the retainer 20 is angularly displaceable in the first direction 21$a$ about the retainer axis 21, permitting the coupler 18 to disengage from the retainer 20. That is, at least one of the retainer 20 and the coupler 18 is preferably configured to disengage from the other one of the retainer 20 and the coupler 18 when the retainer 20 disengages from the actuator pedal 12, as described in further detail below.

Preferably, the pedal assembly 10 further comprises a biasing member 22 configured to bias the brake pedal 14 toward the brake pedal initial position B$_I$. With such a biasing member 22, the brake pedal 14 displaces toward the brake pedal initial position B$_I$ whenever the coupler 18 is disengaged from the retainer 20, as discussed below. As such, when the actuator pedal 12 disengages from the retainer 20 while the retainer 20 is engaged with the coupler 18, the brake pedal biasing member 22 is configured to displace the brake pedal 14 such that the coupled retainer 20 angularly displaces about the retainer axis 21, specifically in the first direction 21$a$, until the coupler 18 disengages from the retainer 20. Thus, the biasing member 22 enables the brake pedal 14 to be disengaged from the retainer 20 by movement of the actuator pedal 12. With this structural arrangement, when a user or driver operates the actuator pedal 12 (i.e., to accelerate the vehicle 1 from a parked position), the brake mechanism 3 is automatically deactivated or "released".

As discussed above, the brake pedal 14 is preferably displaceable between the initial position B$_I$ and the maximum displacement position B$_{MD}$, with the park position B$_P$ being disposed generally between the initial and maximum displacement positions B$_I$, B$_{MD}$. Preferably, at least one of the coupler 18 and the retainer 20 is further configured to disengage from the other one of the coupler 18 and the retainer 20 when the brake pedal 14 displaces from the park position B$_P$ toward the maximum displacement position B$_{MD}$. As such, the brake pedal 14 is also disengageable from retainer 20, so as to be thereafter freely displaceable, by a user/driver displacing or "pushing" the pedal 14 toward the maximum displacement position B$_{MD}$.

Referring now to FIGS. 1-13 and 18-25, the pedal retainer 20 preferably includes a first portion 26 engageable with the actuator pedal 12 and a second portion 28 connected with the first portion 26 and engageable with the coupler 18. Preferably, the retainer first and second portions 26, 28 are separately formed and connected by being directly mounted to a common shaft 25, but may alternatively be directly connected together or even integrally formed. The retainer first portion 26 is configured to engage with the actuator pedal 12 such that the actuator pedal 12 thereby prevents angular displacement of the retainer 20 about the retainer axis 21. The retainer second portion 28 is configured to engage with the coupler 18 when the brake pedal 14 is disposed at the park position B$_P$, such that the brake pedal 14 is retained at the park position B$_P$ when the actuator pedal 12 is engaged with the retainer first portion 26. Preferably, the retainer first and second portions 26, 28 are each generally circular and respectively have first and second outside diameters $OD_1$, $OD_2$, the first outside diameter $OD_1$ being substantially larger than the second outside diameter $OD_2$, as best shown in FIG. 12. Thus, the retainer first portion 26 is preferably substantially radially larger than the retainer second portion 28.

Most preferably, the retainer first portion 26 includes a generally circular disk 27 and the second portion 28 includes a generally circular cylinder 29 coupled with the disk 27, each one of the disk 27 and cylinder 29 being centered about the retainer axis 21 and rotatable about the axis 21 as a single unit. Further, the disks 27, 29 of the two retainer portions 26, 28 are preferably rotationally mounted to a frame 13 of the base 11, which is preferably formed as a bended plate 15 having U-shaped channels 17, with the shaft 25 extending between two walls 15*a*, 15*b* of the frame plate 15.

Furthermore, each one of the retainer first and second portions 26, 28 preferably has a plurality of generally outwardly-extending projections or teeth 30, 32, respectively, but may alternatively have a plurality of inwardly-extending notches (not shown), the teeth 30, 32 or notches being spaced circumferentially about the retainer axis 21. The teeth 30 (or notches) of the retainer first portion 26 are engageable with the actuator pedal 12 and the teeth 32 (or notches) of the retainer second portion 28 are engageable with the coupler 18. Preferably, the actuator pedal 12 includes a stop 34 separately engageable with each one of the plurality of teeth 30 of the retainer first portion 26 and the coupler 18 includes at least one contact surface 36, and preferably a plurality of contact surfaces 36 each provided by a separate tooth 37, each separately engageable with each one of the plurality of teeth 32 (or notches) of the retainer second portion 28. Thereby, the actuator pedal 12 is configured to prevent rotation of the retainer 20 in the first angular direction 21*a* about the retainer axis 21 when the stop 34 contacts one of the teeth 30, as discussed in greater detail below.

Preferably, each of the projections/teeth 30, 32 is configured as a ratchet tooth 36 having a generally radial contact surface 38 and a generally circumferential slide surface 40. Specifically, each ratchet tooth contact surface 38 has a radially inner end 38*a* and a radially outer end 38*b*, and each ratchet tooth slide surface 40 extends circumferentially from the outer end 38*b* of the tooth contact surface 38 to the inner end 38*a* of one adjacent tooth 36. Most preferably, the first and second retainer portions 26, 28 are constructed or formed such that the ratchet teeth 36 of the two portions 26, 28 are angled in opposing directions about the retainer axis 21, as follows. The teeth 30 of the retainer first portion 26 are each generally angled in the first direction 21*a* about the retainer axis 21, such that engagement of the retainer first portion 26 and the actuator pedal 12 prevents rotation of the retainer 20 in the first angular direction 21*a* but permits rotation of the retainer in a second, opposing angular direction 21*b*. Specifically, the ratchet teeth slide surfaces 40 of the retainer first portion 26 each extend in the second angular direction 21*b* from the radial outer end 38*b* of each tooth contact surface 38 to the radial inner end 38*a* of the contact surface 38 of one adjacent tooth 30. As such, the teeth 30 of the retainer first portion 26 are configured to permit the retainer 20 to angularly displace in the second angular direction when the retainer 20 is engaged with the actuator pedal stop 34. That is, the actuator pedal stop 34 is separately contactable with each one of the contact surfaces 38 of the first retainer portion teeth 30, so as to prevent rotation of the retainer 20 in the first angular direction 21*a* about the retainer axis 21, but the stop 34 is slidably displaceable along the teeth slide surfaces 40 to permit rotation of the retainer 20 in the second angular direction 21*b*.

In contrast, the ratchet teeth 32 of the retainer second portion 28 are each generally angled in the second direction 21*b* about the retainer axis 21, such that engagement of the retainer second portion 28 and the coupler 18 prevents displacement of the brake pedal 14 toward the break pedal initial position BI but permits displacement of the brake pedal 14 generally away from the brake initial position BI. Specifically, the ratchet teeth slide surfaces 40 of the retainer second portion 28 each extend in the first angular direction 21*a* from the radial outer end 38*b* of each tooth contact surface 38 to the radial inner end 38*a* of the contact surface 38 of one adjacent tooth 30. As such, the teeth 32 of the retainer second portion 26 are configured to permit the coupler 18 to slidably displace along the slide surface 40 between adjacent contact surfaces 38 so that the brake pedal 14 is displaceable in a direction generally away from the initial position BI when the coupler 18 is engaged with the retainer 20. That is, the coupler catch surface(s) 36 are separately disposable against the contact surface 38 of each one of the second retainer portion teeth 32 so as to releasably couple the brake pedal 14 with the retainer 20, while the coupler 18 will slide against one or more slide surfaces 40 when the brake pedal 14 is displaced toward the maximum displacement position BM.

Referring to FIGS. 6, 7, 14-25, the coupler 18 is preferably formed so as to be moveable between an engaged position $C_E$ (FIGS. 7, 20, 23 and 24) and a nonengaged position $C_N$ (FIGS. 6, 18, 19, 21, 22 and 25), preferably by means of the brake pedal 14 as discussed below. The coupler 18 is configured to engage with the retainer 20 in the engaged position $C_E$, but preferably only when the brake pedal 14 is located at the park position $B_P$. As such, the brake pedal 14 is thereby fixed or retained if the retainer 20 is also concurrently engaged with the actuator pedal 12. Further, the coupler 18 is and remains spaced from the retainer 20 when disposed in the nonengaged position $C_N$, regardless of the location of the brake pedal 14. As such, the brake pedal 14 is freely displaceable between the initial and park positions $B_I$, $B_P$, and preferably between the initial and maximum displacement positions $B_M$, when the coupler 18 is located at the nonengaged position $C_N$.

As best shown in FIGS. 6, 7 and 14-16, the coupler 18 preferably includes an elongated body 46 and a hub 47 pivotally coupled with a main body 50 of the brake pedal 14, as described below, by means of a shaft 48. The elongated body 46 extends generally perpendicularly with respect to the brake pedal body 50 and has a first end 46*a* pivotally connected with the brake pedal main body 50 so as to be rotatable about an axis 49 and an opposing second end 46*b* engageable with the retainer 20. More specifically, the coupler body second end 46*b* preferably includes at least one and most preferably a plurality of the teeth 37 (e.g., three teeth 37), as described above, each providing a contact surface 36 separately engageable with each one of the teeth 32 of the retainer second portion 28, as discussed in detail above.

Referring now to FIGS. 1-4 and 17, the brake pedal 14 preferably includes a main pedal member 50 and a park brake member 52 movably coupled with the main pedal member 50. The main pedal member 50 is preferably pivotably mounted to the vehicle 1 and operatively connected with the braking mechanism 3, preferably by means of a connective member 4 (e.g., a rod or cable) having an end 4*a* attached to the pedal main member 50. As such, pivotal displacement of the brake pedal 14 pushes or pulls the connective member 4 so as to actuate braking mechanism 3. However, the brake pedal 14 may alternatively be operatively coupled with the braking mechanism 3 by any other appropriate means, such as for example, by means of a sensor configured to sense brake pedal position and coupled with an actuator for controlling the braking mechanism (structure not shown). Further, the brake pedal main pedal member or main body 50 preferably has a first end 50a pivotally connected with the vehicle 1 so as to be angularly displaceable about a brake pedal axis 14a, an opposing second or "free" end 50b, and a longitudinal centerline 51 extending generally between the first and second ends 50a, 50b and perpendicular to the pedal axis 14a. The pedal first end 50a is preferably mounted to a shaft 54 extending between two walls 15b, 15c of the bended plate frame 15, as described above, so as to be disposed within one of the frame U-shaped channels 17. However, the brake pedal main member/body 50 may alternatively be linearly displaceably coupled with the vehicle 1, or both pivotally and slidably coupled to the vehicle 1, by any appropriate means.

Furthermore, the park brake member 52 is preferably pivotally connected with the brake main body 50 so as to be angularly displaceable about a generally horizontal axis 52a. Also, the park brake 52 is operatively connected with the coupler 18 and is configured to displace the coupler 18 between the engaged and nonengaged positions CE, CN. As such, the park brake member 52 functions to connect the coupler 18 with the retainer 20, such that the brake pedal 14 is thereby retained at the park position BP by action of the park brake member 52. More specifically, the park brake member 52 is movable with respect to the main brake pedal member 50 between initial and actuation positions PI, PA and the coupler 18 is pivotally connected with the brake pedal main member 50. Further, the brake retainer mechanism preferably also includes a linkage 56 configured to at least displace the coupler 18 toward the coupler engaged position CE when the park brake 52 displaces toward the actuation position PA. Preferably, the linkage 56 is also configured to alternatively displace the coupler 18 toward the coupler nonengaged position CN when the park brake 52 moves back toward the park brake initial position PI.

Preferably, the brake pedal 14 further includes park brake biasing member 53 configured to bias the park brake member 52 toward the park brake initial position $P_I$. As such, when the coupler 18 is disengaged from the retainer 20, the park brake biasing member 53 causes the park brake member 52 to return to the initial position $P_I$, thereby moving the coupler 18 to the nonengaged position $C_N$ through the linkage 56, as described below, while the brake main pedal member 50 moves back toward the brake initial position $B_I$. More specifically, the linkage 56 preferably includes the shaft 48 rotatably coupled with the brake main member 50, as discussed above, and further includes a crank 60 connected with the shaft 58 and a connector 62 extending between and operatively coupling the crank 60 and the park brake member 52. As discussed above, the coupler body 46 is connected with the shaft 48 such that rotation of the shaft 48 pivotally displaces the coupler 18 between the engaged and nonengaged positions $C_E$, $C_N$. The shaft 48 has opposing ends 48a, 48b and the coupler 18 and crank 60 are each mounted at least generally proximal to a separate one of the ends 48a, 48b, respectively.

Further, the connector 62 has a first end 62a coupled with the park brake member 52 and a second end 62b coupled with the crank 60. With such a linkage structure, displacement of the park brake member 52 pivots the crank 60, and thus the shaft 48, so as to thereby pivot the coupler 18 between the engaged and nonengaged positions $C_E$, $C_N$. Preferably, the connector 62 includes upper and lower shafts 64, 66 movably connected together, and a biasing member (not shown) configured to bias the two shafts 64, 66 generally away from each other. The upper shaft 64 has a first, upper end 64a connected with the park brake member 52 and an opposing second, lower end 64b. The lower shaft 66 has a first, lower end 66a attached to the crank 60 and an opposing second, upper end 66b. The lower shaft second end 66b is movably connected with the upper shaft second end 64b such that the coupler 18 is movable while the park brake member 52 remains generally stationary with respect to brake main pedal member 50. As such, "push back" is minimized on the park brake member 52, and thus on a user's foot disposed thereon.

With the above structure, when the park brake member 52 is initially displaced toward the actuation position $P_A$, the connector upper shaft 64 first displaces downwardly toward the crank 60 while the lower shaft 66 remains generally stationary as the biasing member compresses between the portions of the two shafts (not depicted). When the biasing member is sufficiently compressed, the movement of the upper shaft 64 is transferred through the biasing member such that the upper and lower shafts 64, 66 displace generally as a single unit. Thereafter, further movement of the park brake member 52 toward the actuation position $P_A$ causes the connector 62 to pivot the crank 60 in a generally downward direction, such that the crank 60 rotates the shaft 48 about the shaft axis 49 in a first direction 49a, causing the coupler 18 to pivotally displace toward the engaged position $C_E$ and into engagement with the retainer 20. Alternatively, when the coupler 18 is disengaged from the retainer 20, the park brake biasing member 53 displaces the park brake member 52 toward the park brake initial position $P_I$, causing the connector upper shaft 64 to displace generally upwardly in a direction away from the crank 60. As the upper shaft 64 moves upwardly, the lower shaft 66 is pulled upwardly with the shaft 64, causing the crank 60 to be pivoted generally upwardly. Such movement of the crank 60 rotates the shaft 48 in a second direction 49b about the axis 49, which pivotally displaces the coupler 18 away from the retainer 20 to the nonengaged position $C_N$. Although the pedal assembly 10 preferably includes a linkage 56 that is formed and functions as described above, it is within the scope of the present invention to provide the pedal assembly 10 with any other appropriate mechanism/structure for operatively coupling the park brake 52 with the coupler 18.

Referring now to FIGS. 1, 2, 5, 8 and 10, the actuator pedal 12 preferably includes a main body 70 connected with the vehicle 1, the stop 34 being connected with the body 70 and engageable with the retainer 20. The body 70 is preferably pivotally connected with the vehicle 1 such that angular displacement of the main body 70 moves the stop 34 between an engaged position $S_E$ and one or more nonengaged positions $S_N$. The stop 34 is preferably configured such that at least a portion of the stop 34 is disposed against the first portion 26 of the retainer member 20 when the stop 34 is located at the stop engaged position $S_E$, so that the actuator pedal 12 prevents angular displacement of the retainer 20 about the retainer axis 21. Specifically, when the actuator pedal 12 is disposed at the pedal initial position $A_I$, the stop 34 is engaged with the retainer 20 so as to prevent rotation of the retainer 20 in the first angular direction 21a, as described above and in further detail below.

Figure 10:
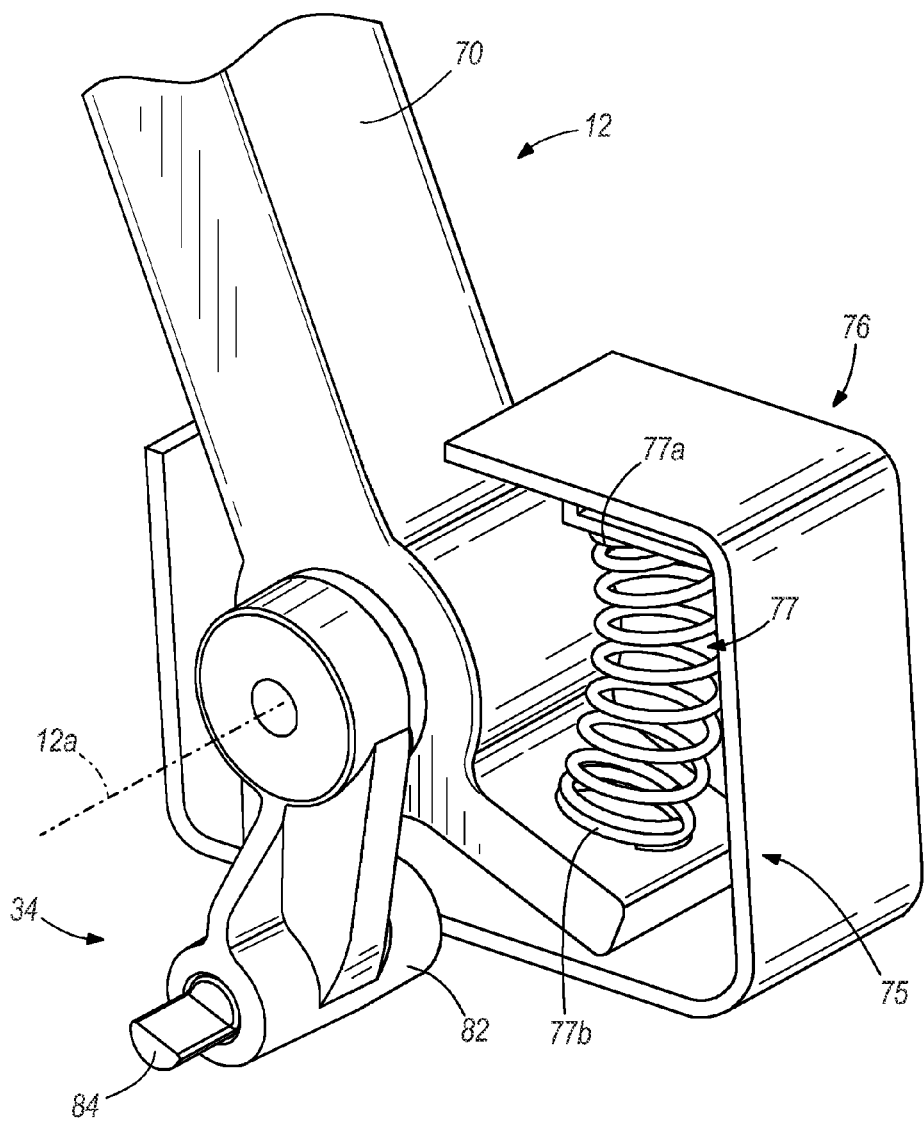
FIG. 10 is a more diagrammatic, broken-away perspective view of a lower portion of the actuator pedal.
Figure 17:
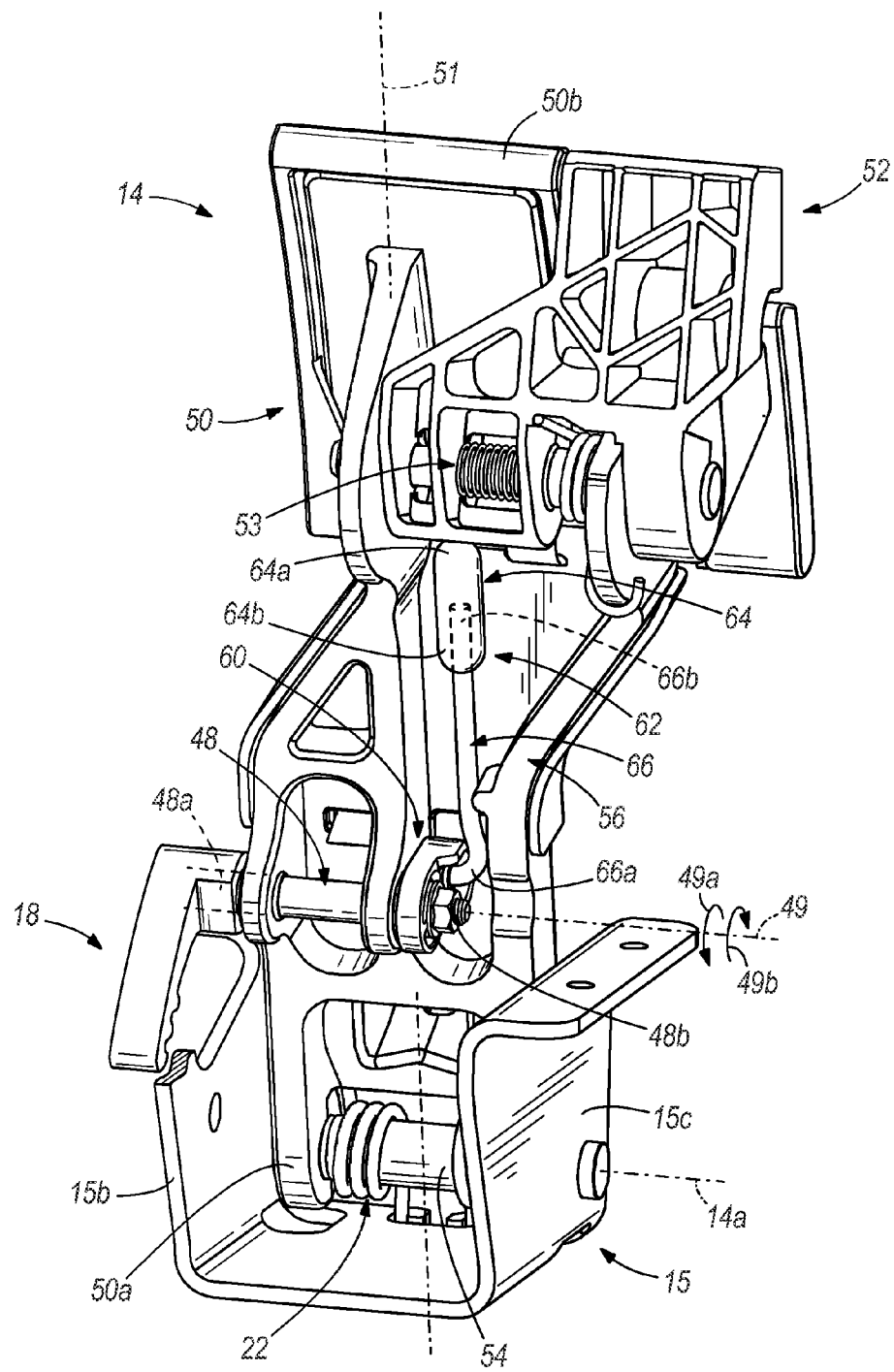
FIG. 17 is a rear perspective view of the brake pedal.

Preferably, the pedal body 70 is pivotally mounted within a generally rectangular housing 76 by means of a stub shaft portion (not shown) of the body 70 disposed within the bearing opening (not shown) of the housing 76. The housing 76 is preferably attached to one end 15a of the bended plate frame 15, so as to position the actuator pedal 12 with respect to the brake pedal 14 and the retainer 20. Further, the main body 70 is angularly displaceable about a generally horizontal actuator pedal axis 12a when moving between the initial and maximum displacement positions $A_I$, $A_{MD}$, as described above, the actuator pedal axis 12a being generally parallel with the brake pedal axis 14a. As depicted in FIG. 10, the actuator pedal 12 further includes a biasing member 75 configured to bias the actuator pedal main body 70 toward the initial position $A_I$. Most preferably, the biasing member 75 includes a coil spring 77 having a first end 77a disposed against an inner surface of the housing 76 and a second end 77b disposed against the pedal body 70, but may be provided by any other appropriate component (e.g., a torsion spring, etc.).

Furthermore, the actuator pedal 12 is preferably operatively coupled with the motor 2 by means of a position sensor 78 mounted to the housing 76. Specifically, the position sensor 78 is configured to sense the angular position of the main body 70 with respect to the pedal axis 12a and is electrically coupled with either a throttle mechanism (not shown) of a gas motor 2 or a variable resistor (e.g., a potentiometer) or other device for controlling speed of an electric motor 2. In either case, the speed of the motor 2 is adjusted based upon the angular position of the actuator pedal body 70 about the axis 12a.

Referring to FIGS. 5, 10 and 18-25, the actuator pedal stop 34 preferably includes a body 82 connected with the pedal main body 70 so as to be rotatable about the pedal axis 12a and a contact pin 84. The stop body 82 is generally elongated and extends generally radially with respect to the pedal axis 12a and the pin 84 is connected with the body 82 so as to be spaced from and extending generally parallel to the actuator pedal axis 12a. Further, the stop pin 84 is directly contactable with the retainer 20, specifically the retainer first portion 26, when the stop 34 is located at the stop engaged position $S_E$ so as to thereby prevent angular displacement of the retainer 20 about the retainer axis 21. Alternatively, the stop pin 84 is spaced from the retainer 20 when the stop 34 is at a stop nonengaged position $S_N$, such that the retainer 20 is then freely rotatable about the retainer axis 21. More specifically, when the actuator pedal 12 is located in the initial position $A_I$, the stop pin 84 disposable against one of the contact surfaces 38 of the retainer ratchet teeth 30, so as to prevent rotation of the retainer 20 in the first angular direction 21a. However, the retainer 20 is capable of rotating in the second direction 21b, during which movement the stop pin 84 slides along one or more ratchet teeth slide surfaces 40.

Figure 18:
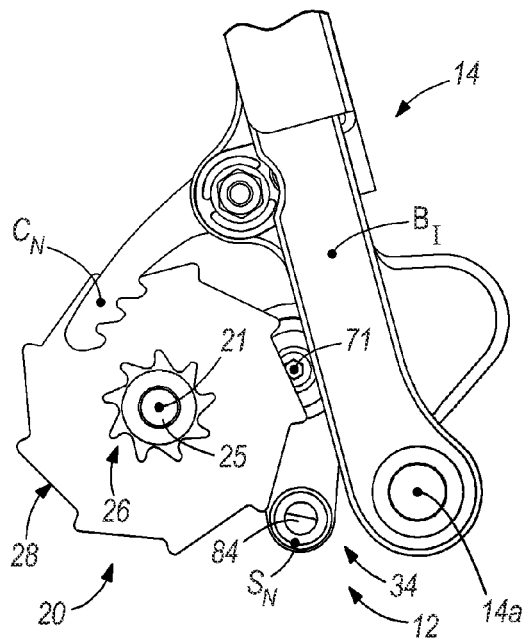
FIG. 18 is a side elevational view of the brake pedal, the coupler, the retainer, and an actuator stop, showing the brake pedal at the initial position and the actuator stop and coupler at nonengaged positions.
Figure 19:
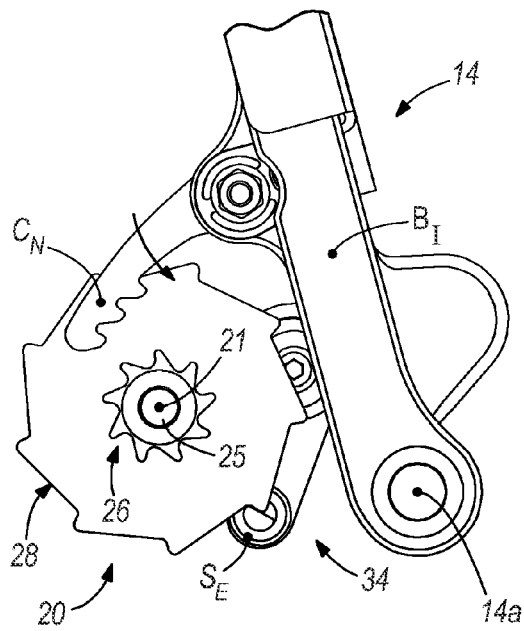
FIG. 19 is another view of the components of FIG. 18, showing the brake pedal at the initial position, the coupler moving toward the engaged position, and the actuator stop at the engaged position.
Figure 20:
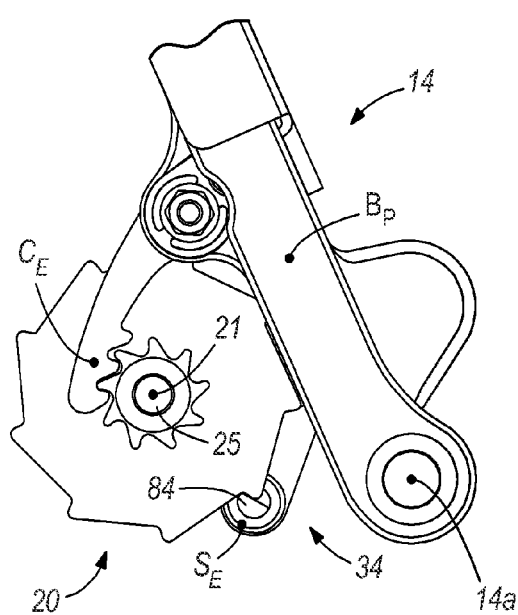
FIG. 20 is another view of the components of FIG. 18, showing the brake pedal at the park position and both the coupler and the actuator stop at engaged positions.
Figure 21:
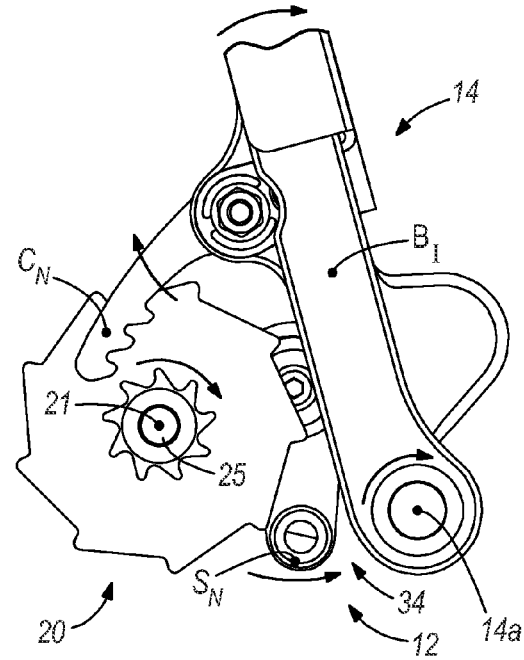
FIG. 21 is another view of the components of FIG. 18, showing the brake pedal moving toward the initial position, the coupler at the non-engaged position, and the actuator stop at the engaged position.
Figure 22:
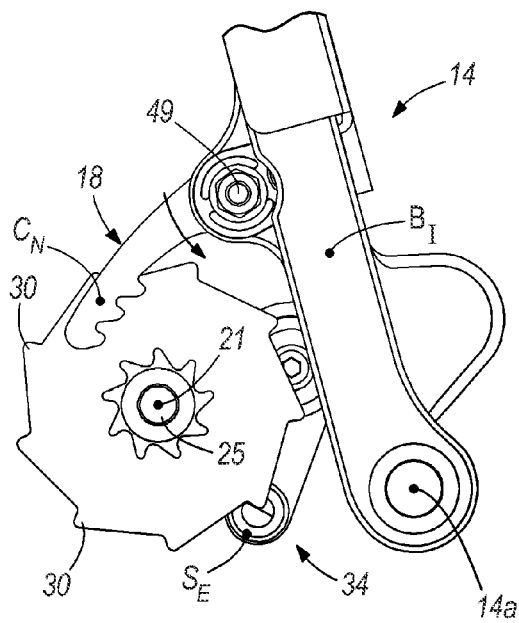
FIG. 22 is another view of the components of FIG. 18, showing the brake pedal at the initial position, and both the coupler and actuator stops displaced to non-engaged positions.
Figure 23:
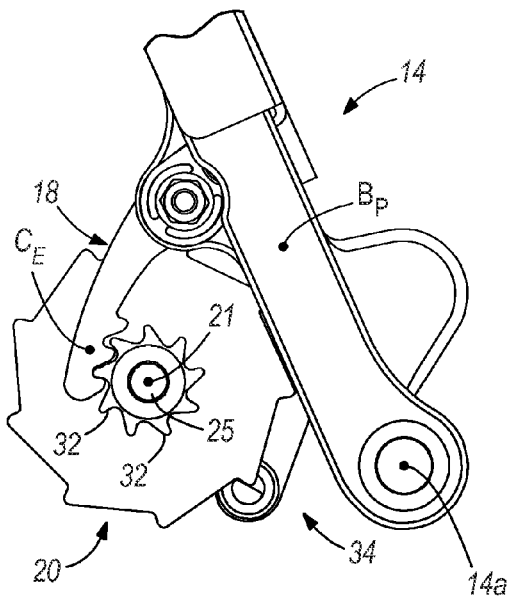
FIG. 23 is a another view of the components of FIG. 18, showing the brake pedal at the park position and both the coupler and the actuator stop at engaged positions.

Referring to FIGS. 4-7 and 18-25, with the structure described above, the pedal assembly 10 functions generally as follows. A vehicle operator will use the actuator pedal 12 to regulate vehicle speed by pushing against the actuator pedal body 70 to a greater or lesser extent, such that the pedal body 70 remains at a displaced position, as depicted in FIGS. 5B, 18 and 21. As such, the actuator pedal stop 34 remains disengaged from the retainer 20 and the retainer 20 is freely rotatable about the axis 21. However, once the operator desires to stop the vehicle 1, the operator releases the actuator pedal 12 such that the pedal 12 is biased to the pedal initial position $A_I$. As the pedal 12 moves toward the initial position $A_I$, the actuator stop 34 engages with the retainer first portion 26, such that the stop pin 84 moves into contact with one of the ratchet teeth 36, as depicted in FIG. 19. Once the actuator pedal stop 34 is engaged with the retainer 20, the retainer 20 is prevented from rotating about the retainer axis 21. Thereafter, the brake pedal 14 is freely moveable between the initial and maximum displaced positions $B_I$, $B_{MD}$ to slow and/or completely stop the vehicle 1, as depicted in FIG. 19. Once the vehicle 1 is stopped, the operator may activate the park brake 52 to displace the coupler 18 from the nonengaged position $C_N$ to the engaged position $C_E$, thus causing one or more coupler teeth 37 to engage with at least one and preferably at least two teeth 32 of the retainer second portion 28, as shown in FIGS. 20 and 23. At this point, the brake pedal 14 is releasably fixed in the park position $B_P$ by the simultaneous interaction of the coupler 18 with the retainer second portion 28 and the actuator pedal stop with the retainer first portion 26, such that the vehicle 1 is maintained in a parked state.

Thereafter, the brake pedal 14 is released from the parked position $B_P$ in one of two manners. First, as shown in FIG. 21, the brake pedal 14 may be released merely by displacing the actuator pedal 12 from the initial position $A_I$, i.e., pushing the actuator pedal 12 to accelerate the vehicle 1. As the pedal 12 moves from the initial position $A_I$ toward the maximum displaced position $A_{MD}$, the stop 34 displaces generally away from the retainer 20, thereby disengaging the stop pin 84 from the first portion teeth 30. At this point, the brake pedal biasing member 22 causes the brake pedal 14 to displace from the park position $B_P$ toward the initial position $B_I$, such that the coupler 18 pulls the retainer 20 to angularly displace in the first direction 21a until the coupler teeth 37 disengage from the teeth 32 of the retainer second portion 28. Thereafter, the brake pedal 14 continues pivoting about the brake pedal axis 14a until reaching the brake pedal initial position $B_I$.

Figure 24:
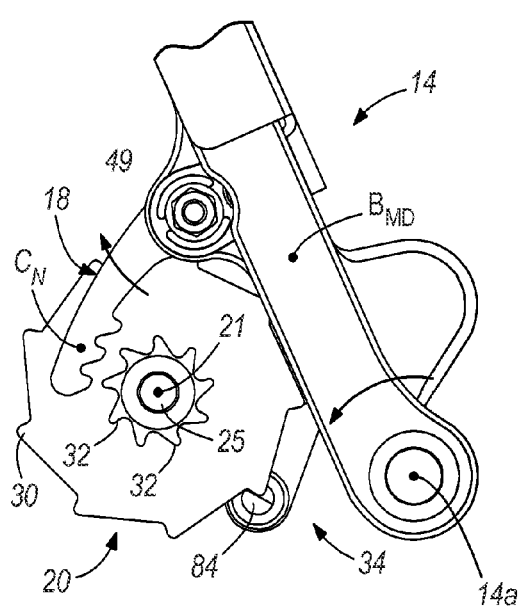
FIG. 24 is another view of the components of FIG. 18, showing the brake pedal at the park position, the actuator stop at engaged position, and the coupler moving toward the non-engaged position.

Alternatively, the vehicle operator may release the brake pedal 14 from the park position by pushing the brake pedal 14 from the park position toward the maximum displaced position $B_{MD}$, as depicted in FIG. 24. As the brake pedal 14 moves toward the maximum displaced position $B_{MD}$, the coupler teeth 37 move out of engagement with the teeth 32 of the retainer second portion 28. Thereafter, the park brake member 52 is displaced toward the park brake initial position $P_I$ by action of the park brake biasing member 53, while the brake pedal main body member 50 is movable toward the initial position $B_I$ by the brake biasing member 22, as indicated in FIG. 25.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A pedal assembly for a vehicle, the vehicle including a motor and a braking mechanism, the pedal assembly comprising:
   an actuator pedal movably coupled with the vehicle so as to be displaced between an initial position and a maximum displaced position, the actuator pedal being operatively connected with the motor;
   a brake pedal movably coupled with the vehicle so as to be displaced between an initial position and a park position, the brake pedal being operatively coupled with the braking mechanism so as to actuate the braking mechanism in the brake park position; and
   a brake retainer mechanism including a coupler connected with the brake pedal and a retainer movably coupled with the vehicle so as to be angularly displaceable about an axis, the retainer being configured to releasably engage with the coupler and with the actuator pedal so as to prevent angular displacement of the retainer in a first direction about the retainer axis such that the brake pedal is releasably retained at the park position when each of the coupler and the actuator pedal is engaged with the retainer, wherein the pedal retainer includes:
- a circular first portion defining a first outside diameter and selectively engaged with the actuator pedal such that the actuator pedal prevents angular displacement of the retainer about the retainer axis; and
- a circular second portion defining a second outside diameter connected with the first portion and selectively engaged with the brake pedal when the brake pedal is disposed at the park position such that the brake pedal is retained at the park position when the actuator pedal is engaged with the retainer first portion, the first outside diameter being larger than the second outside diameter.

2. The pedal assembly as recited in claim 1 wherein:
at least one of the retainer and the actuator pedal is configured to engage with the other one of the retainer and the actuator pedal when the actuator pedal is located proximal to the actuator pedal initial position such that the actuator pedal prevents angular displacement of the retainer in a first direction about the retainer axis; and
at least one of the retainer and the actuator pedal is configured to disengage from the other one of the retainer and the actuator pedal when the actuator pedal displaces from the initial position toward the maximum displaced position such that the retainer is angularly displaced in the first direction about the retainer axis.

3. The pedal assembly as recited in claim 2 wherein at least one of the coupler and the retainer is configured to disengage from the other one of the coupler and the retainer when the retainer disengages from the actuator pedal.

4. The pedal assembly as recited in claim 3 further comprising a biasing member configured to bias the brake pedal toward the brake pedal initial position such that the brake pedal displaces toward the brake pedal initial position when the coupler is disengaged from the retainer.

5. The pedal assembly as recited in claim 4 wherein when the actuator pedal disengages from the retainer while the retainer is engaged with the coupler, the brake pedal biasing member is configured to displace the brake pedal such that the coupled retainer angularly displaces about the retainer axis until the coupler disengages from the retainer.

6. The pedal assembly as recited in claim 3 wherein:
the brake pedal is displaced between the initial position and a maximum displacement position, the park position being disposed between the initial and maximum displacement positions, the brake pedal being configured to operate the braking mechanism in each one of the park and maximum displacement positions; and
at least one of the coupler and the retainer is configured to disengage from the other one of the coupler and the retainer when the brake pedal displaces from the park position toward the maximum displacement position.

7. The pedal assembly as recited in claim 1 wherein:
at least one of the coupler and the retainer is configured to disengage from the other one of the coupler and the retainer when the retainer is disengaged from the actuator pedal; and
the pedal assembly further comprises a biasing member configured to bias the brake pedal toward the brake pedal initial position such that the brake pedal displaces toward the brake initial position when the coupler disengages from the retainer.

8. The pedal assembly as recited in claim 1 wherein:
the brake pedal is displaced between the initial position and a maximum displacement position, the park position being disposed between the initial and maximum displacement positions, the brake pedal being configured to operate the braking mechanism in each one of the park and maximum displacement positions; and
at least one of the coupler and the retainer is configured to disengage from the other one of the coupler and the retainer when the brake pedal displaces from the park position toward the maximum displacement positions.

9. The pedal assembly as recited in claim 1 wherein the retainer first portion includes a circular disk and the second portion includes a circular cylinder coupled with the disk, each one of the disk and cylinder being centered about the retainer axis and rotatable about the axis as a single unit.

10. The pedal assembly as recited in claim 1 wherein each one of the retainer first and second portions has one of a plurality of outwardly-extending teeth and a plurality of inwardly-extending notches, the one of the teeth and notches being spaced circumferentially about the retainer axis, the one of the teeth and notches of the retainer first portion being selectively engaged with the actuator pedal and the one of the teeth and notches of the retainer second portion being selectively engaged with the coupler.

11. The pedal assembly as recited in claim 10 wherein the coupler includes at least one tooth selectively engaging each one of the one of the plurality of teeth and the plurality of notches of the retainer second portion separately.

12. The pedal assembly as recited in claim 10 wherein each of one of the retainer first and second portions has a plurality of ratchet teeth.

13. The pedal assembly as recited in claim 12 wherein:
the ratchet teeth of the retainer first portion are each angled in first direction about the retainer axis such that engagement of the retainer first portion and the actuator pedal prevents rotation of the retainer in the first angular direction about the retainer axis and permits rotation of the retainer in the second angular direction; and
the ratchet teeth of the retainer second portion are each angled in a second direction about the retainer axis such that engagement of the retainer second portion and the coupler prevents displacement of the brake pedal toward the break pedal initial position and permits displacement of the brake pedal away from the brake initial position.

14. The pedal assembly as recited in claim 10 wherein the actuator pedal includes a stop, the stop selectively contacting each one of the teeth of the first portion separately and the actuator pedal is configured to prevent rotation of the retainer in the first angular direction about the retainer axis when the stop contacts one of the teeth.

15. The pedal assembly as recited in claim 1 wherein:
each one of the retainer first and second portions includes a plurality of radially outwardly extending projections spaced circumferentially about the retainer axis, each projection including a radial contact surface and a circumferential slide surface;
the actuator pedal includes a stop separately contactable with each one of the contact surfaces of the first retainer portion projections so as to prevent rotation of the retainer in the first angular direction about the retainer axis; and
the coupler has at least one catch surface separately disposable against the contact surface of each one of the second retainer portion projections so as to releasably couple the brake pedal with the retainer.

16. The pedal assembly as recited in claim 15 wherein:
each projection contact surface has a radially inner end and a radially outer end;
the projection slide surfaces of the retainer first portion each extend in the first angular direction from the radial inner end of a separate one of the contact surfaces to the radial outer end of an adjacent contact surface such that first portion projections are configured to permit the retainer to angularly displace in the second angular direction when the retainer is engaged with the actuator pedal stop; and the projection slide surfaces of the retainer second portion each extend in the second angular direction from the radial inner end of a separate one of the contact surfaces to the radial outer end of an adjacent contact surface such that second portion projections are configured to permit the coupler to slidably displace along the slide surface between adjacent contact surfaces so that the brake pedal is displaced in a direction away from the initial position when the coupler is engaged with the retainer.

17. The pedal assembly as recited in claim 1 wherein the retainer first and second portions are one of mounted to a common shaft, directly connected together, and integrally formed.

18. The pedal assembly as recited in claim 1 wherein:
the coupler is moved between an engaged position and a nonengaged position, the coupler being configured to engage with the retainer in the engaged position when the brake pedal is at the park position and being spaced from the retainer in the nonengaged position; and
the brake pedal is configured to displace the coupler between the engaged and nonengaged positions.

19. The pedal assembly as recited in claim 18 wherein the brake pedal is freely displaced between the initial position and the park position when the coupler is located at the nonengaged position.

20. The pedal assembly as recited in claim 18 wherein the retainer includes a plurality of teeth and the coupler has at least one tooth selectively engaged with at least one of the retainer teeth when the coupler is disposed at the engaged position and the brake pedal is at the park position.

21. The pedal assembly as recited in claim 18 wherein the brake pedal includes a main pedal member and a park brake member movably coupled with the main pedal member, the park brake member being operatively connected with the coupler and configured to displace the coupler between the engaged and nonengaged positions.

22. The pedal assembly as recited in claim 21 wherein:
the park brake member is movable between initial and actuation positions;
the coupler is pivotally connected with the brake main member; and
the brake retainer mechanism further includes a linkage configured to displace the coupler toward the coupler engaged position when the park brake displaces toward the actuation position.

23. The pedal assembly as recited in claim 22 wherein the linkage is further configured to displace the coupler toward the coupler nonengaged position when the park brake displaces toward the park brake initial position.

24. The pedal assembly as recited in claim 22 wherein the linkage includes:
a shaft rotatably coupled with the brake main member, the coupler being connected with the shaft such that rotation of the shaft displaces the coupler between the engaged and nonengaged positions;
a crank connected with the shaft; and
a connector having a first end coupled with the park brake member and a second end coupled with the crank such that displacement of the park brake member pivots the crank so as to pivot the coupler between the engaged and nonengaged positions.

25. The pedal assembly as recited in claim 24 wherein the connector link includes:
an upper shaft having a first end connected with the park brake and an opposing second end; and
a lower shaft having first end attached to the crank and an opposing second end, the lower shaft second end being movably connected with the upper shaft second end such that the coupler is movable while the park brake member remains stationary with respect to brake main pedal member.

26. The pedal assembly as recited in claim 22 wherein the brake pedal further includes a first biasing member configured to bias the brake main pedal member toward the brake pedal initial position and a second biasing member configured to bias the park brake member toward the park brake initial position.

27. The pedal assembly as recited in claim 1 wherein the brake pedal includes a main pedal member and a park brake member movably coupled with the main pedal member, the park brake member being operatively connected with the coupler and configured to displace the coupler between the engaged and nonengaged positions.

28. The pedal assembly as recited in claim 1 wherein:
the brake pedal includes a main body having a first end pivotally connected with the vehicle so as to pivot about a brake pedal axis, an opposing second end, and a longitudinal centerline extending between the first and second ends and perpendicular to the axis; and
the coupler includes a body with a first end pivotally connected with the brake pedal main body and an opposing second end selectively engaged with the retainer, the coupler body extending perpendicularly with respect to the brake body centerline.

29. The pedal assembly as recited in claim 1 wherein the actuator pedal includes:
a main body pivotally connected with the vehicle so as to be angularly displaced about an actuator pedal axis when moving between the initial and maximum displacement positions, the main body portion being configured to support an end of a connective member extending between the actuator pedal and the motor; and
a stop connected with the pedal main body such that angular displacement of the main body moves the stop between an engaged position and a nonengaged position, at least a portion of the stop being disposed against a portion of the retainer member when the stop is located at the stop engaged position such that the actuator pedal prevents angular displacement of the retainer about the retainer axis.

30. The pedal assembly as recited in claim 29 wherein the stop has a body connected with the actuator pedal main body and a contact pin connected with the stop body so as to be spaced from and extending parallel to the actuator pedal axis, the pin selectively contacting the retainer when the stop is located at the stop engaged position so as to prevent angular displacement of the retainer about the retainer axis and being spaced from the retainer when the stop is at the stop nonengaged position such that the retainer is freely rotatable about the retainer axis.

31. The pedal assembly as recited in claim 29 wherein the actuator pedal further includes a biasing member configured to bias the actuator pedal main body toward the initial position.

32. The pedal assembly as recited in claim 29 wherein the actuator pedal axis extends at least parallel to the retainer axis.

33. The pedal assembly as recited in claim 1 further comprising a base connected with the vehicle and configured to mount the actuator pedal, the brake pedal, and the brake retainer mechanism to the vehicle.

34. A pedal assembly for a vehicle, the vehicle including a motor and a braking mechanism, the pedal assembly comprising:
   an actuator pedal movably coupled with the vehicle so as to be displaced between an initial position and a maximum displaced position, the actuator pedal being operatively connected with the motor;
   a brake pedal movably coupled with the vehicle so as to be displaced between an initial position and a park position, the brake pedal being operatively coupled with the braking mechanism so as to actuate the braking mechanism in the brake park position; and
   a coupler connected with the brake pedal;
   a retainer movably coupled with the vehicle so as to be angularly displaced about an axis and including a first and second cylindrical portions, each cylindrical portion having a plurality of teeth, the actuator pedal being selectively engaged with at least one of the teeth of the retainer first portion so as to prevent angular displacement of the retainer about the retainer axis and the coupler being engageable selectively engaged with at least one of the teeth of the retainer second portion such that the brake pedal is releasably retained at the park position when the actuator pedal is engaged with the retainer.

35. A pedal assembly for a vehicle, the vehicle including a motor and a braking mechanism, the pedal assembly comprising:
   an actuator pedal movably coupled with the vehicle so as to be displaced between an initial position and a maximum displaced position, the actuator pedal being operatively connected with the motor;
   a brake pedal movably coupled with the vehicle so as to be displaced between an initial position and a park position, the brake pedal being operatively coupled with the braking mechanism so as to actuate the braking mechanism in the brake park position; and
   a brake retainer mechanism including a coupler connected with the brake pedal and a retainer movably coupled with the vehicle so as to be angularly displaceable about an axis, the retainer being configured to releasably engage with the coupler and with the actuator pedal so as to prevent angular displacement of the retainer in a first direction about the retainer axis such that the brake pedal is releasably retained at the park position when each of the coupler and the actuator pedal is engaged with the retainer,
   wherein:
      the coupler is moved between an engaged position and a nonengaged position, the coupler being configured to engage with the retainer in the engaged position when the brake pedal is at the park position and being spaced from the retainer in the nonengaged position, the brake pedal is configured to displace the coupler between the engaged and nonengaged positions,
      the brake pedal includes a main pedal member movable between initial and actuation positions and a park brake member movably coupled with the main pedal member, the park brake member being operatively connected with the coupler and configured to displace the coupler between the engaged and nonengaged positions,
      the coupler is pivotally connected with the brake main member, and
      the brake retainer mechanism further includes a linkage configured to displace the coupler toward the coupler engaged position when the park brake displaces toward the actuation position, and to displace the coupler toward the coupler nonengaged position when the park brake displaces toward the park brake initial position, the linkage including,
         a shaft rotatably coupled with the brake main member, the coupler being connected with the shaft such that rotation of the shaft displaces the coupler between the engaged and nonengaged positions;
         a crank connected with the shaft; and
         a connector having a first end coupled with the park brake member and a second end coupled with the crank such that displacement of the park brake member pivots the crank so as to pivot the coupler between the engaged and nonengaged positions.

36. A pedal assembly for a vehicle, the vehicle including a motor and a braking mechanism, the pedal assembly comprising:
   an actuator pedal movably coupled with the vehicle so as to be displaced between an initial position and a maximum displaced position, the actuator pedal being operatively connected with the motor, the actuator pedal including,
      a main body pivotally connected with the vehicle so as to be angularly displaced about an actuator pedal axis when moving between the initial and maximum displacement positions, the main body portion being configured to support an end of a connective member extending between the actuator pedal and the motor; and
      a stop connected with the pedal main body such that angular displacement of the main body moves the stop between an engaged position and a nonengaged position;
   a brake pedal movably coupled with the vehicle so as to be displaced between an initial position and a park position, the brake pedal being operatively coupled with the braking mechanism so as to actuate the braking mechanism in the brake park position; and
   a brake retainer mechanism including a coupler connected with the brake pedal and a retainer movably coupled with the vehicle so as to be angularly displaceable about an axis, the retainer being configured to releasably engage with the coupler and with the actuator pedal so as to prevent angular displacement of the retainer in a first direction about the retainer axis such that the brake pedal is releasably retained at the park position when each of the coupler and the actuator pedal is engaged with the retainer,
   wherein at least a portion of the stop being disposed against a portion of the retainer member when the stop is located at the stop engaged position such that the actuator pedal prevents angular displacement of the retainer about the retainer axis.

* * * * *